United States Patent [19]

Dawson et al.

[11] Patent Number: 4,876,651
[45] Date of Patent: Oct. 24, 1989

[54] DIGITAL MAP SYSTEM

[75] Inventors: John F. Dawson, Albuquerque, N. Mex.; Eldon J. Thompson, Ruckersville, Va.; James A. Cousens, Albuquerque, N. Mex.

[73] Assignee: Honeywell Inc., Minneapolis, Minn.

[21] Appl. No.: 192,798

[22] Filed: May 11, 1988

[51] Int. Cl.[4] ............................ G01S 7/44; G01S 7/04
[52] U.S. Cl. .................................... 364/449; 364/443; 364/518; 364/521; 434/3; 342/179; 340/995
[58] Field of Search .............. 364/443, 449, 460, 518, 364/521, 522, 200, 900; 434/2, 3; 342/13, 192, 179; 340/995, 723, 798

[56] References Cited
U.S. PATENT DOCUMENTS

| | | | |
|---|---|---|---|
| 4,484,192 | 11/1984 | Seitz et al. | 364/449 |
| 4,489,389 | 12/1984 | Beckwith et al. | 364/522 |
| 4,555,703 | 11/1985 | Cantrell | 342/13 |
| 4,590,569 | 5/1986 | Rogoff et al. | 364/449 |
| 4,660,157 | 4/1987 | Beckwith et al. | 364/518 |
| 4,685,068 | 8/1987 | Greco, II et al. | 364/518 |

Primary Examiner—Parshotam S. Lall
Assistant Examiner—V. N. Trans
Attorney, Agent, or Firm—Arnold L. Albin

[57] ABSTRACT

A digital mapping display system for an aircraft wherein map data from a mass memory unit is periodically loaded into RAM in the form of a cache memory in accordance with the aircraft trajectory. The cache memory is randomly addressable within the physical address space of a control processor, individual segments of the cache memory being loaded with map data and updated while other segments are being displayed, thereby avoiding the inherent delay of accessing the mass memory unit and addressing the entire RAM array. Parallel processing of map data and symbology facilitate a real-time display.

70 Claims, 28 Drawing Sheets

Microfiche Appendix Included
(1 Microfiche, 44 Pages)

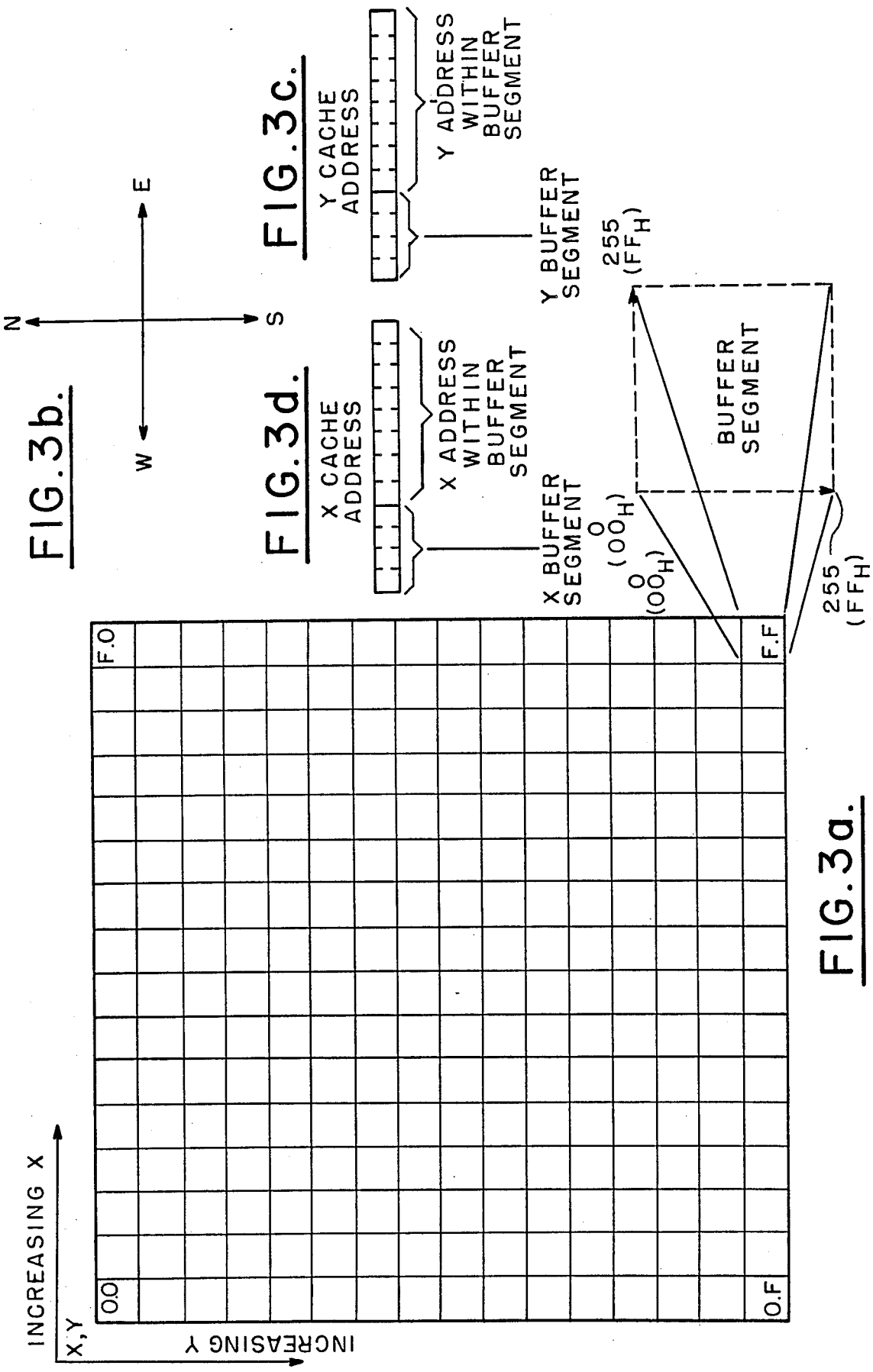

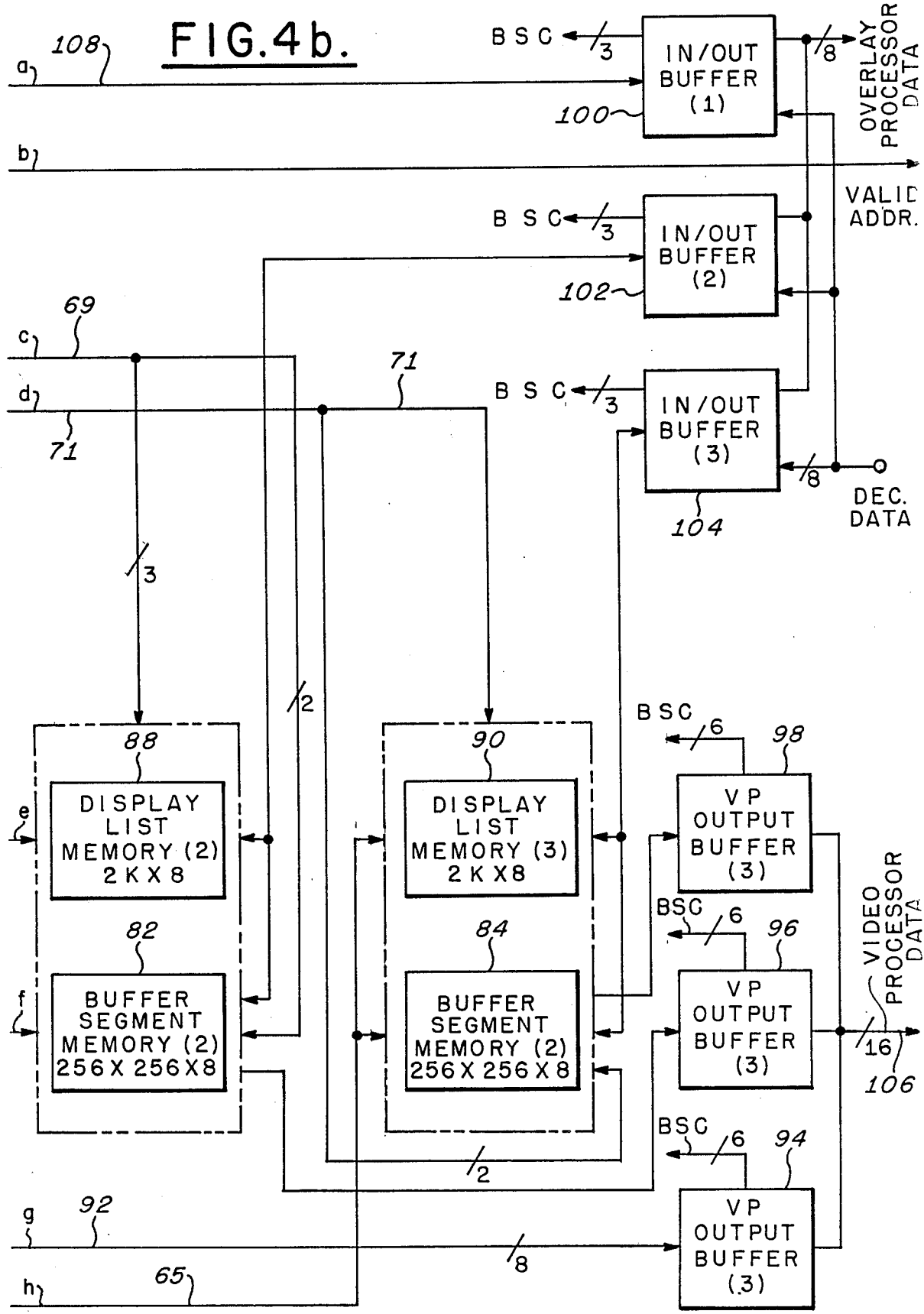

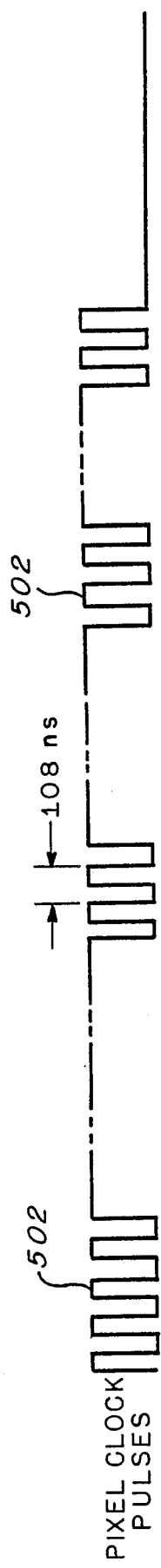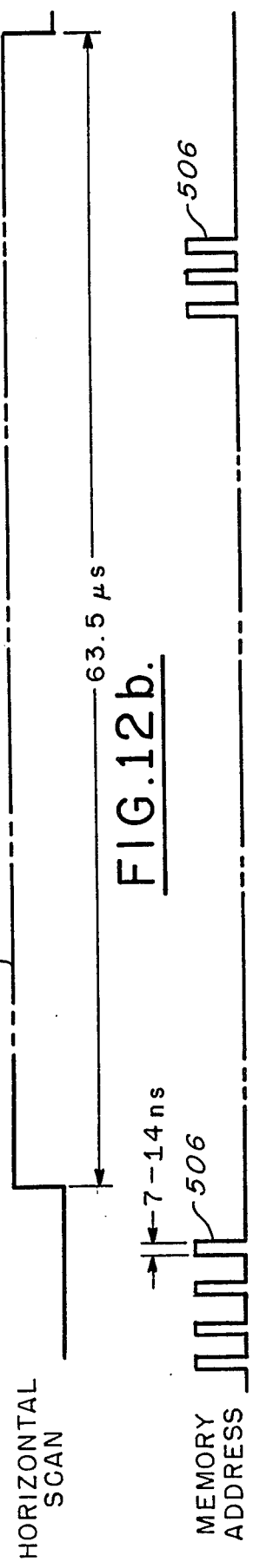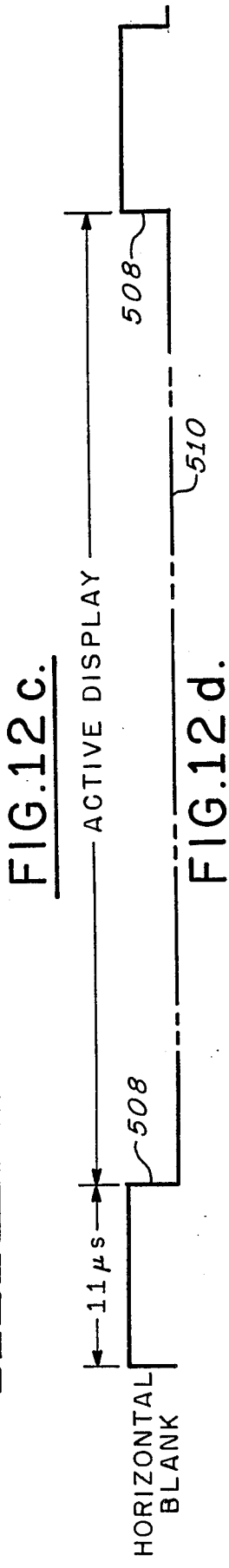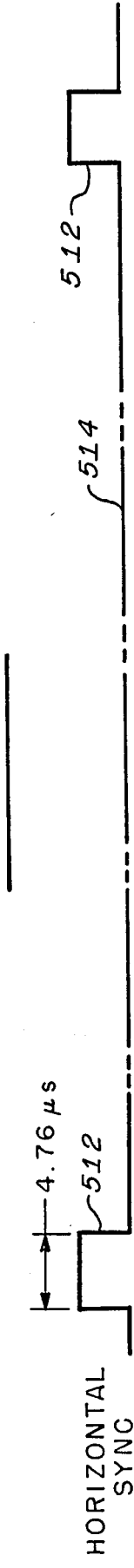
FIG.12a.
FIG.12b.
FIG.12c.
FIG.12d.
FIG.12e.

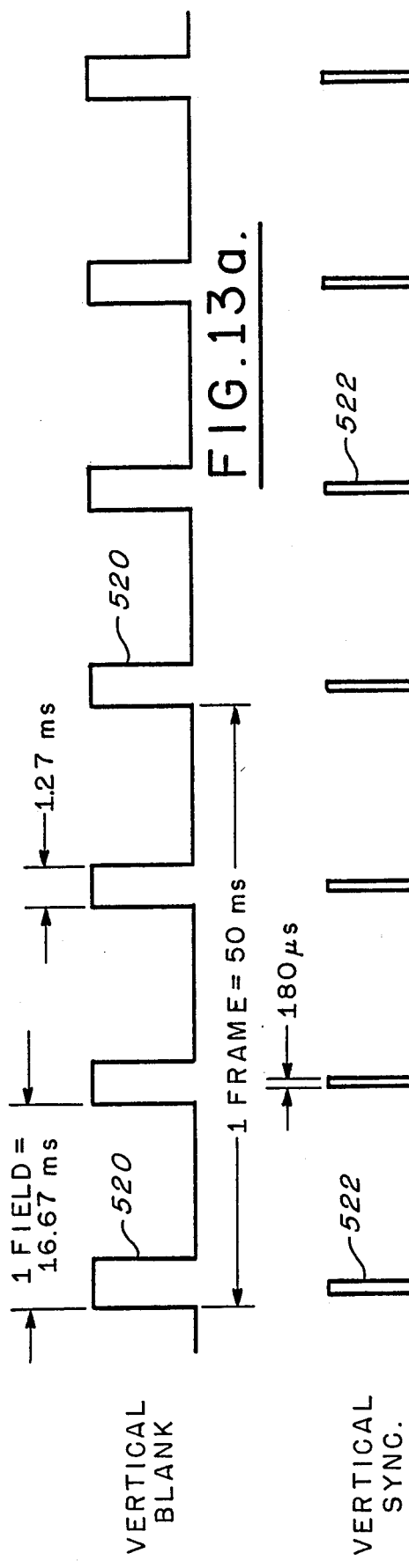
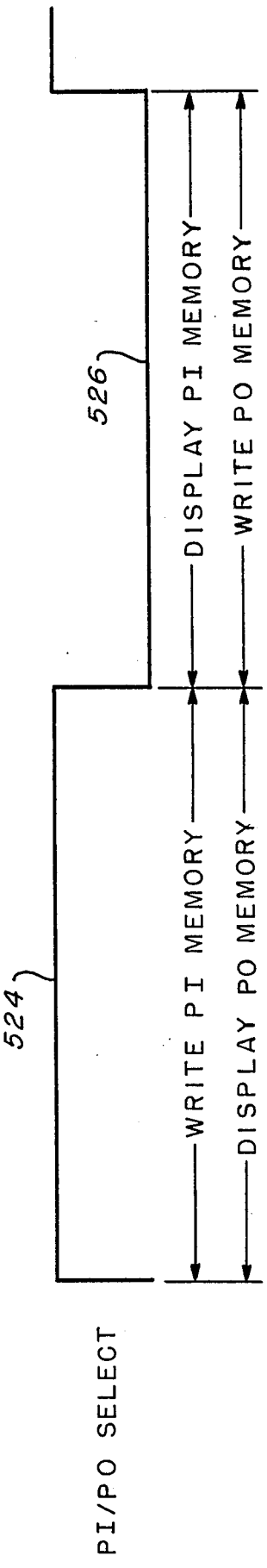
FIG. 13a.
FIG. 13b.
FIG. 13c.

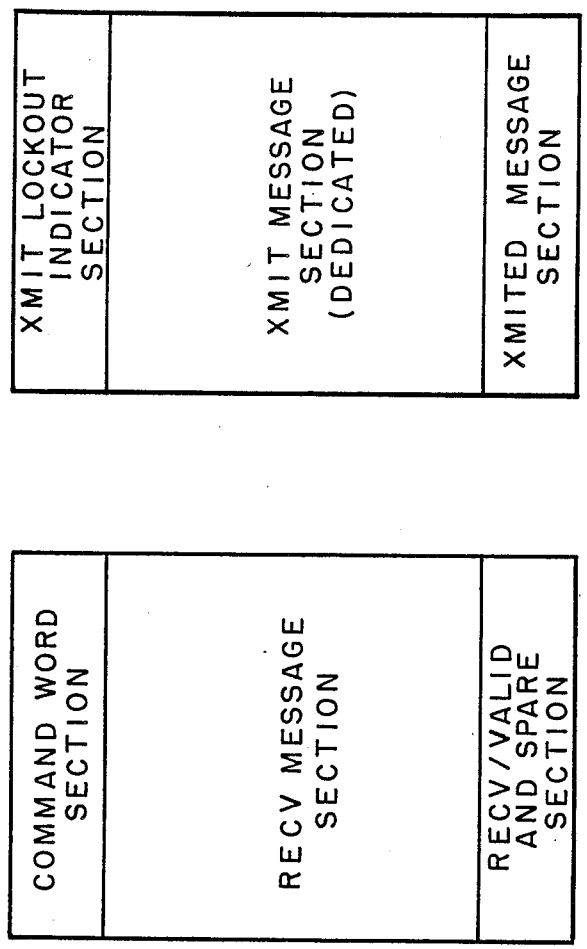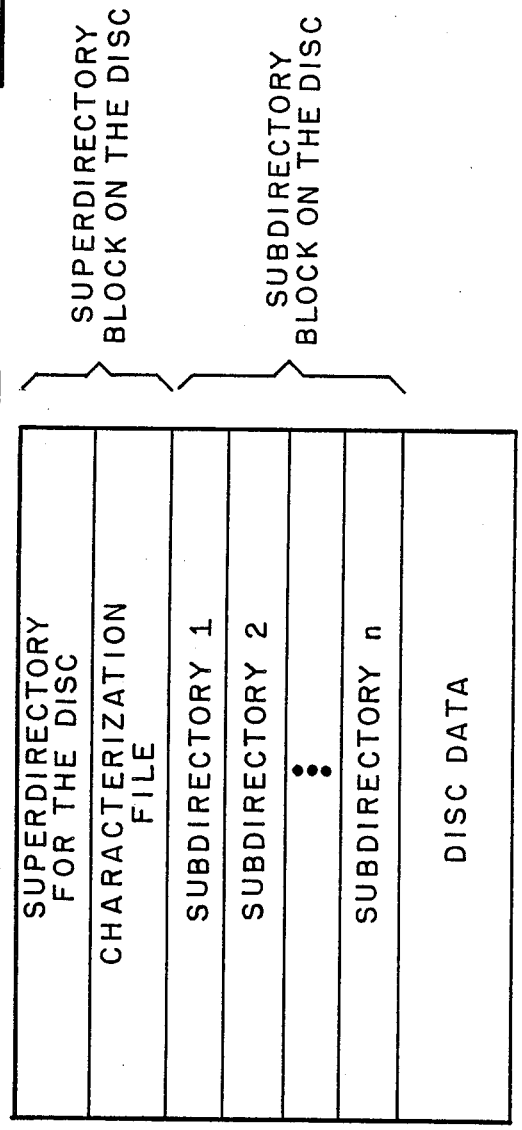

MULTIPLE DMU SUPPORT
MAP COVERAGE OVERLAP BETWEEN DISKS

SUPERDIRECTORY PARSING SCHEME

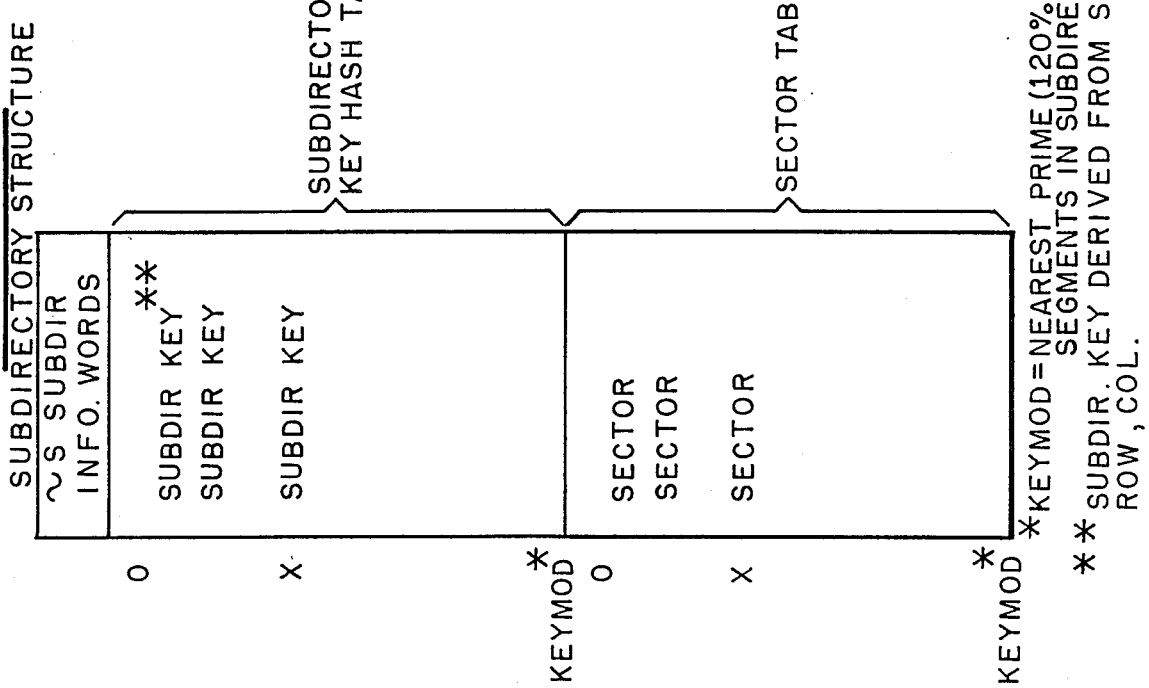

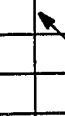

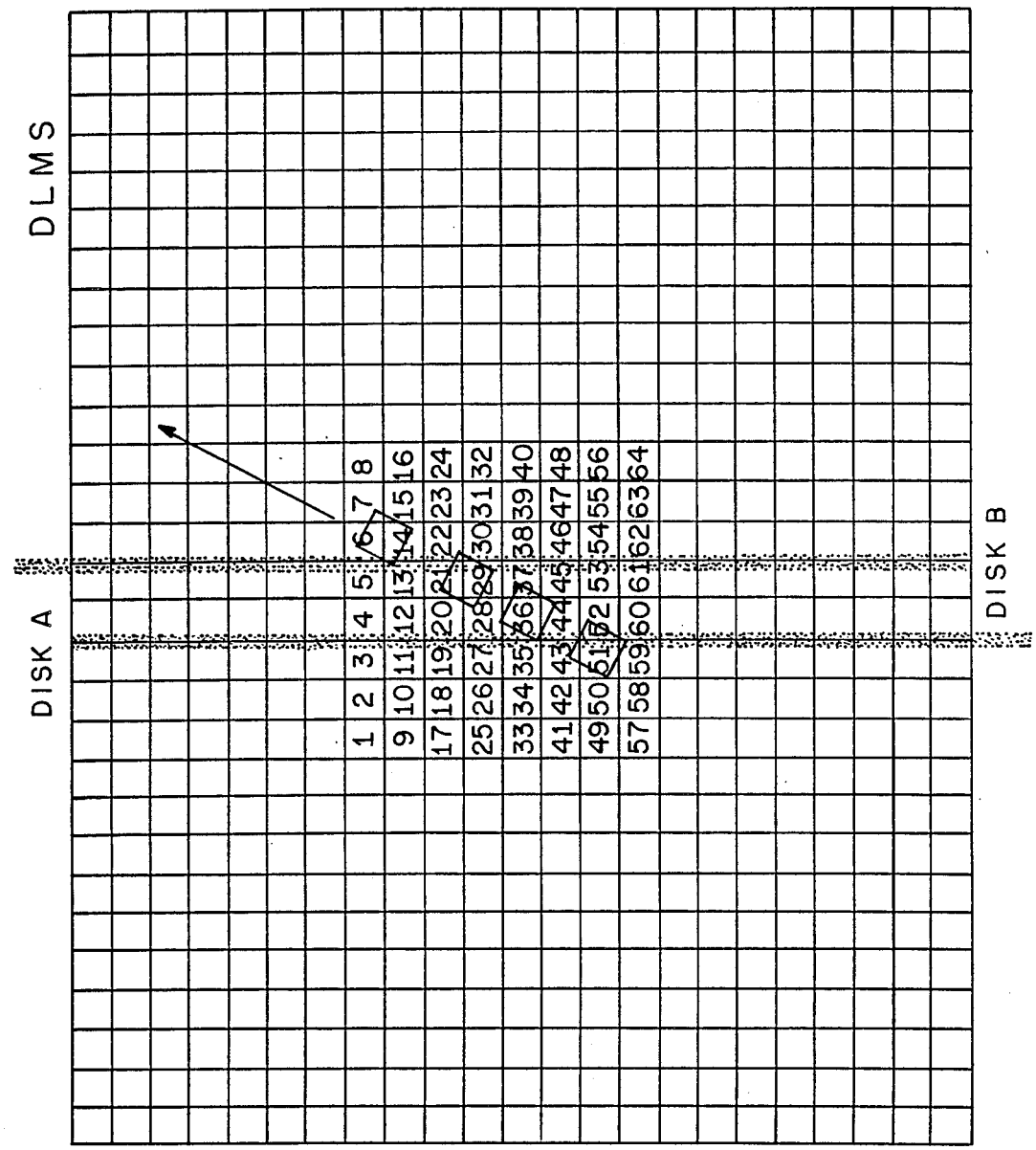

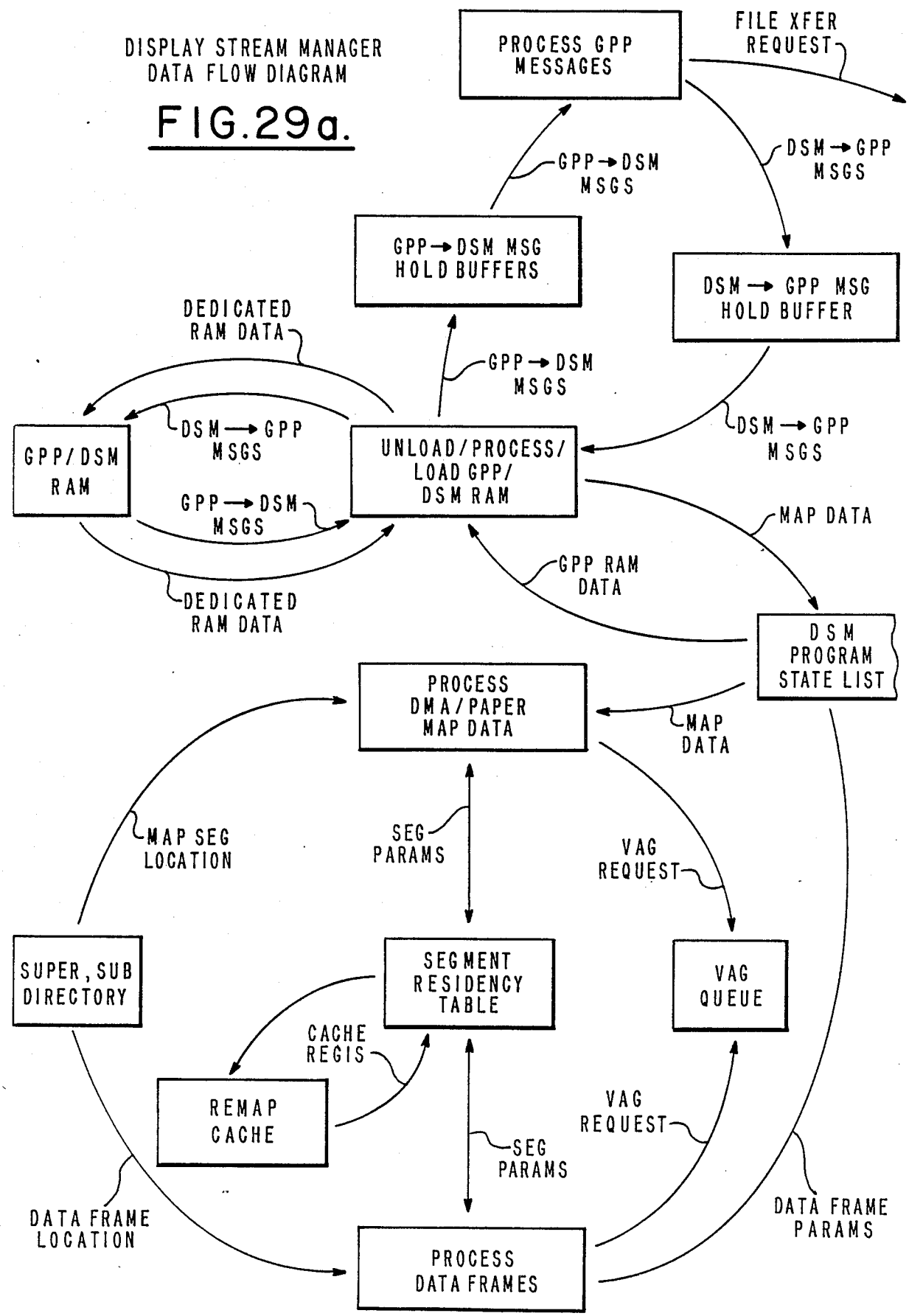

DISPLAY STREAM MANAGER
DATA FLOW DIAGRAM

DIGITAL MAP SYSTEM

DIGITAL MAP SYSTEM

This invention was made with United States Government support and the United States Government has certain rights therein.

BACKGROUND OF THE INVENTION

Microfiche Appendix Included (44 frames, 1 page).

1. Field of the Invention

The invention relates to a computer generated video imaging system, and more particularly to a digital map system for providing a real time moving display on a cathode ray tube.

2. Description of the Prior Art

Map displays are of primary importance to aircraft pilots in view of the hazards of low altitude flight over unfamiliar terrain where the terrain may be obscured by cloud cover or darkness. While paper maps can provide topographical features of the terrain, it poses a large burden on the pilot to try to calibrate the aircraft's position from a paper map on the pilot's knee. A digital map system electronically generates a map similar to the format of a paper map. It is desirable that such a display automatically calibrate the aircraft's position, show terrain elevation, and cultural and linear features such as roads, railroads, and rivers. One such system is described by Seitz, et al., in U.S. Pat. No. 4,484,192. A moving map display has a mass memory for storing a complete map of the terrain to be traversed by a vehicle A scan memory stores a portion of the complete map corresponding to the area immediately surrounding the vehicle. The portion of the map stored in the scan memory is updated by a computer and periodically refreshed for display on a cathode ray tube In this system, as the aircraft traverses the terrain, data in the scan memory is sequentially replaced on a column by column basis using a wrap-around scan technique.

Another system is described by Saito in U.S. Pat. No. 4,490,717. A plurality of drive route charts are stored in cassette tape memory and sequentially switched for display on a CRT as a vehicle travels a predetermined distance. The drive route charts are stored in memory as image information together with distance information. Distance stored in memory is updated by the actual travel distances of the car as predetermined check points are passed.

The present invention overcomes the disadvantages of the wrap-around storage system and the check point navigational system, both of which are slow in accessing data and updating memory, therefore rendering real time displays difficult The present invention provides an improved virtual memory storage and access technique for providing a real time display which permits overlaying data such as character symbology, contour lines, and dynamic sun angle shading in addition to the terrain data and for decluttering by selecting or deselecting individual features from the map for display.

SUMMARY OF THE INVENTION

According to the invention there is provided a computer generated video image depicting a map of both the terrain and cultural features such as hydrography, vegetation, airports, etc., based on geographical coordinate inputs. The data required to build the display is extracted from a preprocessed data base. The image data update rate is sufficient to create a realistic, real time moving display.

The digital mapping display system for use in an aircraft includes a mission computer for generating digital signals indicative of the aircraft's present longitude and latitude coordinate positions, a heading signal indicative of the angular direction of motion, and signals corresponding to map data cultural features and graphical data, a mass memory unit for storing map data signals in digital form which represent a map of the territory overflown by the aircraft and which provide map data signals corresponding thereto, and for storing overlay data in digital form representative of graphical information to be superposed on the map data and for providing overlay data signals corresponding thereto. In the preferred embodiment, the mass memory unit is coupled to a mass data controller which extracts map data or overlay data in accordance with the aircraft trajectory and periodically updates the stored images. A cache memory is coupled to the data controller for electronically storing digital images which are indicative of portions of the map of territory overflown by and surrounding the aircraft and the graphical images overlaying these areas. The cache memory includes a plurality of randomly programmable segmented buffer elements arranged in a virtual memory array for storing and dynamically relocating portions of the map data with respect to changes in the aircraft's coordinate position. Control signals from a control processor write data and refresh portions of the cache memory while simultaneously reading data out from other portions. The control processor receives signals generated by the mission computer for periodically updating the cache memory as the aircraft's coordinate position changes. The mass memory unit is periodically accessed to update the cache memory as the aircraft reaches the boundaries of the prestored information.

An address generator also coupled to the control processor reads and extracts map data and overlay data from the cache memory and transfers the data to a scene memory or an overlay memory, respectively. The address generator reads the X and Y addresses corresponding to predetermined locations within the physical cache memory storage area into registers in which the $x_i$ and $y_j$ addresses of the map data and overlay data corresponding to the digital images are arbitrarily stored in memory segments at predetermined location within the cache memory arranged in an XY Cartesian coordinate system. The pixel signals corresponding to map data at the X and Y coordinate locations are mapped into the scene memory while other XY addresses corresponding to overlay data pixels are mapped into the overlay memory. The scene memory and overlay memory include first and second memory banks in which map data or overlay data are alternately and sequentially stored and written out. A ping-pong memory configuration allows data to be stored in one section of the memory while simultaneously the previously stored data is read out in response to control signals from the control processor and from a timing generator. The contents of the scene memory and overlay memory are combined and applied to a video generator wherein the bit-mapped pixel signals are converted to an image in analog form displayable in color or monochromatically. The timing generator on command of the control processor provides horizontal and vertical synchronizing signals, horizontal and vertical blanking signals, pixel clock and line video timing signals for a raster display.

BRIEF DESCRIPTION OF THE DRAWINGS

FIGS. 3a, 3b, 3c, and 3d are a schematic depiction in X—Y coordinates of the physical cache memory addressing space.

FIGS. 4A and 4B are a functional block diagram showing the structure of a cache memory buffer segment.

FIGS. 12a, 12b, 12c, 12d, 12e, and 13a, 13b and 13c are block diagrams showing waveforms provided by the timing generator.

FIGS. 16–30 are figures referenced to microfiche Appendix A helpful in understanding the data flow of the various system processors.

DESCRIPTION OF THE PREFERRED EMBODIMENT

It is an object of the present invention to provide an apparatus which can sequentially display each of a plurality of sectioned flight route charts, geographical and cultural overlays upon such charts, and other types and formats of data to aid the pilot in navigation. Typically, the invention will support variable map scales with a coverage of up to 90,000 square miles of digital land mass data and 60 sq. ft. of chart. Data compression may be applied to aeronautical charts to increase the area coverage. Predetermined cultural features may be selected for overlay on the terrain data base, in addition to contour lines representative of elevation. Terrain rendering may be controlled by color banding elevation zones and adding programmable sun angle shading for three dimensional relief. Other navigational data may be overlayed on the data base and interactively displayed. The displayed map image may be presented either in track-up or north-up modes, in a centered or decentered tracking fashion, and at one of six scales with up to a 2:1 magnification. The image may be slewed to an arbitrary location in the data base coverage and have occluded windows invoked on the display as well as ASCII text symbology overwritten.

Figure 1:
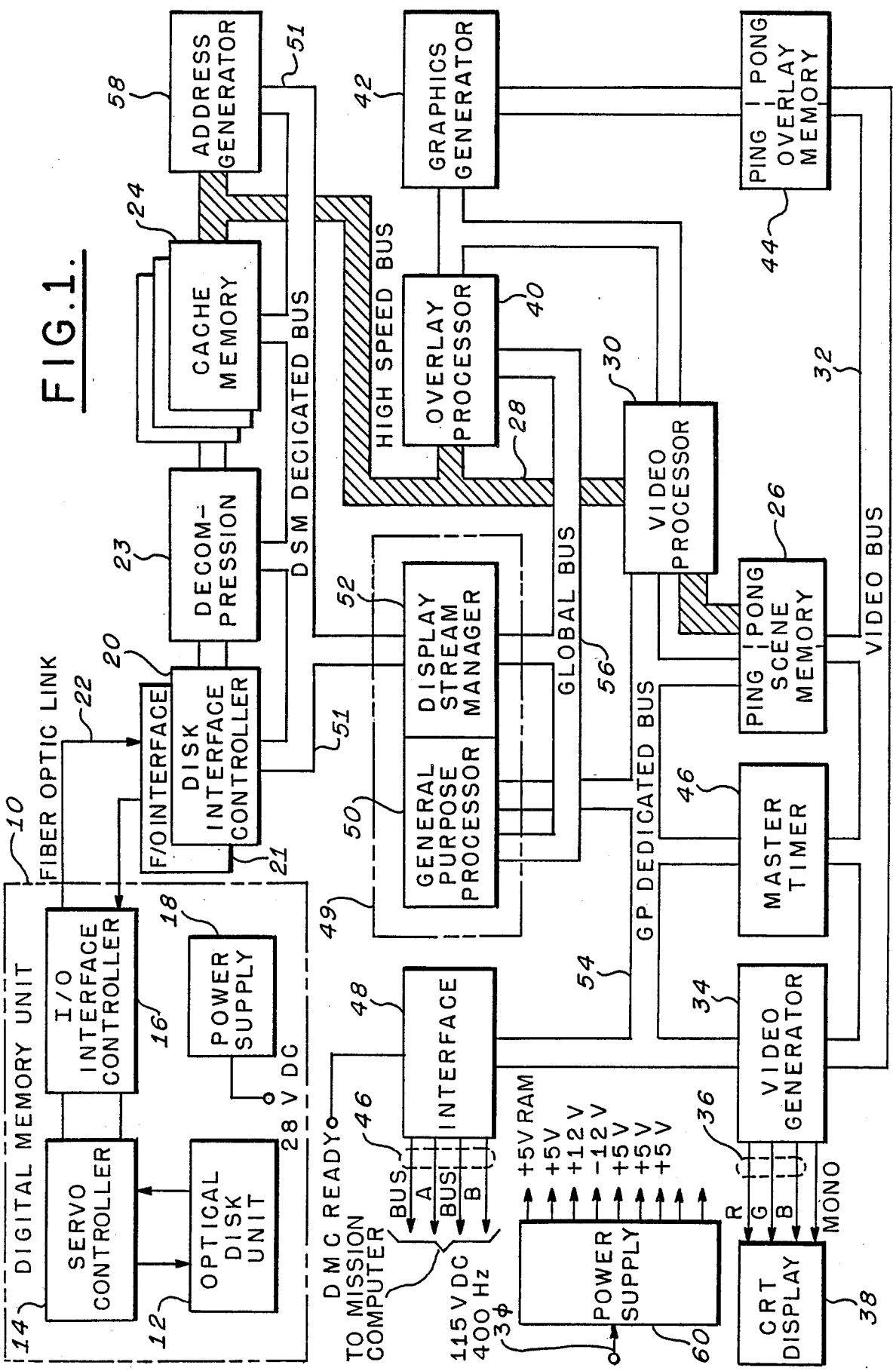
FIG. 1 is a block diagram of the digital mapping display system of the present invention.

A block diagram of the digital mapping system is shown in FIG. 1. A mass memory unit 10 stores digital image data representative of the area over which the aircraft is to be flown and associated cultural and linear overlay features. The mass memory unit comprises an optical disk unit 12, a servo controller 14, an input/output (I/O interface controller 16 and a power supply 18.

Information stored in the optical disk unit 12 includes map information such a plan view information from processed mapping data, plan view information from processed paper maps, flight plan data, terrain feature data and pictorial format. A mission computer provides zoom, heading, scale factors, aircraft information and other parameters for modifying the format of data stored on disk. Data may be stored and recovered using any of the well-known compression/decompression techniques. Digital map data is stored in optical disk unit 12 in the form of sequential blocks or tiles. These tiles are loaded as required into cache memory 24.

The present invention employs a cache memory in a virtual memory address system. In a virtual memory system the disk memory is used as the main memory, so that the operating program is substantially independent of the actual amount of RAM in the system. The cache memory is used as a temporary memory for the map data that is currently accessed by the processor. Periodically the disk memory is addressed and updated information is loaded into cache memory. A virtual memory system must provide hardware support for the translation between the virtual (logical) addresses and real (physical or absolute) addresses. The virtual memory address space is further divided into fixed length units, which herein are defined to correspond to buffer segments in the cache memory.

The virtual memory system allows only those sections of data currently being referenced to be stored in RAM, with the rest of the data being stored on disk or other mass memory. When new data is required, it is brought into the cache memory and replaces the data no longer required. It is a feature of the present invention that segments of cache memory may be loaded with data anywhere in the virtual memory address space and logically addressed anywhere within the physical address space. Methods for translating between virtual addresses and physical addresses are well known.

Interface controller 20 controls mass memory disk unit 12 for extracting the map data signals or overlay data signals and periodically providing updated images. On command of the disk interface controller 20 plan view information is processed over fiber optic link 22 by applying the stored map information to a decompression circuit 23 that is compatible with the compression algorithm, and reading the decompressed data into the cache memory 24 which is also loaded with encoded color and intensity information. The cache memory is used to buffer the digital map data as it is retrieved from the optical disk unit and to store the out-of-view map segments stored in look-ahead fashion for later viewing, and the segment descriptor tables. Thus the map display can be built up without the inherent delay of accessing the optical disk unit, thereby allowing a real-time display update rate. Data in the cache memory 24 will preferably be stored in north-up format centered at the aircraft location where the data was requested. The data in cache memory 24 is then mapped to a scene memory 26 via a high speed bus 28 and a video processor 30. The scene memory 26 is approximately one fourth the size of the cache memory. Scene memory 26 is comprised of a ping-pong memory so that one section can be updated while a second section is being read out. When the scene memory is fully loaded, it is read out on video bus 32 to video generator 34 which comprises the waveform generation circuitry and a digital-to-analog converter for decoding and conversion to an RGB or monochrome composite video format. The analog signals on RGB lines 36 are coupled to a display 38 for presentation to the pilot. Display 38 is typically of the cathode ray tube type, although other types of displays are also suitable.

Data continues to be processed from the cache memory as long as the information to fill the scene memory is contained within the cache memory. When the scene memory moves outside a predetermined buffer zone within the cache memory, a new update from the optical disk unit 12 is required.

Video processor 30 contains color lookup tables, contour analysis, and bilineaar interpolation circuitry. Contour lines are generated by the video processor 30 and may be selected or deselected as required. The contour line information is mapped into scene memory 26 where it is also mixed with feature data. Feature and other symbology is generated by the overlay processor 40 which drives a vector generator 42 writing into a full field bit-mapped overlay memory 44. Feature information is received from the optical disk via the cache memory in an ASCII symbol and primitive vector format. Symbol information may include a symbol code, XY position within the map sector, and latitude and longitude of the map sector. Other features such as roads, railroads, and rivers may be embedded in the terrain data structure. The overlay processor 40 may be programmed to edit out symbols not in the field represented by the overlay memory 44 and to rotate and translate the display from a north-up format to any other desired direction and to write the complete display into the overlay memory 44. The overlay memory 44 is also comprised of a ping-pong memory. The scene and overlay memories are scanned in synchronism by a master timer 46 via video bus 32 and decoded and converted to RGB video in video generator 34.

A mission computer (not shown) resident on the aircraft collects data from various avionics subsystems and generates digital signals indicative of the aircraft's present longitude and latitude coordinate positions, a heading signal indicative of the angular direction of motion, and signals corresponding to the desired map data and overlay data. Bus 46 transfers the command and status signals from the mission computer to an interface I/O 48. Interface 48 couples the command and control data from the avionics mission computer to the digital map display system. A control processor 49 includes a general purpose processor 50 and a display stream manager 52. The general purpose processor 50 is coupled via a dedicated bus 54 to interface 48 and controls data transfer with this mission computer. Received data, data to be transmitted, storage buffer addresses, and interrupt information are transferred between the mission computer and the general purpose processor 50 via the dedicated bus 54. By the use of direct memory access a complete message may be received and stored in the processor memory without loading the processor itself. The general purpose processor 50 computes mode commands and status data from the bus 46 information and transmits it to the display stream manager 52. Display stream manager 52 controls display operations and maintains a steady flow of data throughout the system. It receives aircraft coordinates and other parameters via the general purpose processor on global bus 56 and uses this data to determine optimal configuration of the system. The display stream manager will initialize the disk controller with data or command functions and will have the disk interface steadily streaming data which is soon to be required for display into segments of the cache memory. Once all the data necessary to build a display is resident in the cache memory, the display stream manager 52 initializes the address generator 58 and the overlay processor 40 to begin processing the scene memory and graphical overlays. The address generator is initialized with a base address, length, and orientation parameters to extract display data from the cache memory. Cache memory 24 is organized as a virtual XY Cartesian system. The display stream manager 52 can map the memory segments in the physical address space anywhere in the virtual system, which comprises the entire optical disk memory, in a manner to be described. The overlay processor acts in parallel with the display stream manager in building a display. Since separate map terrain and graphic overlay memories are provided, both displays can be built simultaneously. The overlay processor combines all alphanumeric and graphic symbology and terrain feature data into a separate memory in real time. Prior to the address generator 58 extracting data from the cache memory 24, the overlay processor 40 reads descriptor data from a segment descriptor table in the cache memory. Once the overlay processor 40 has extracted its descriptor table, it begins to build bit-mapped graphics overlay via graphics generator 42 to the overlay memory 44.

Figure 14:
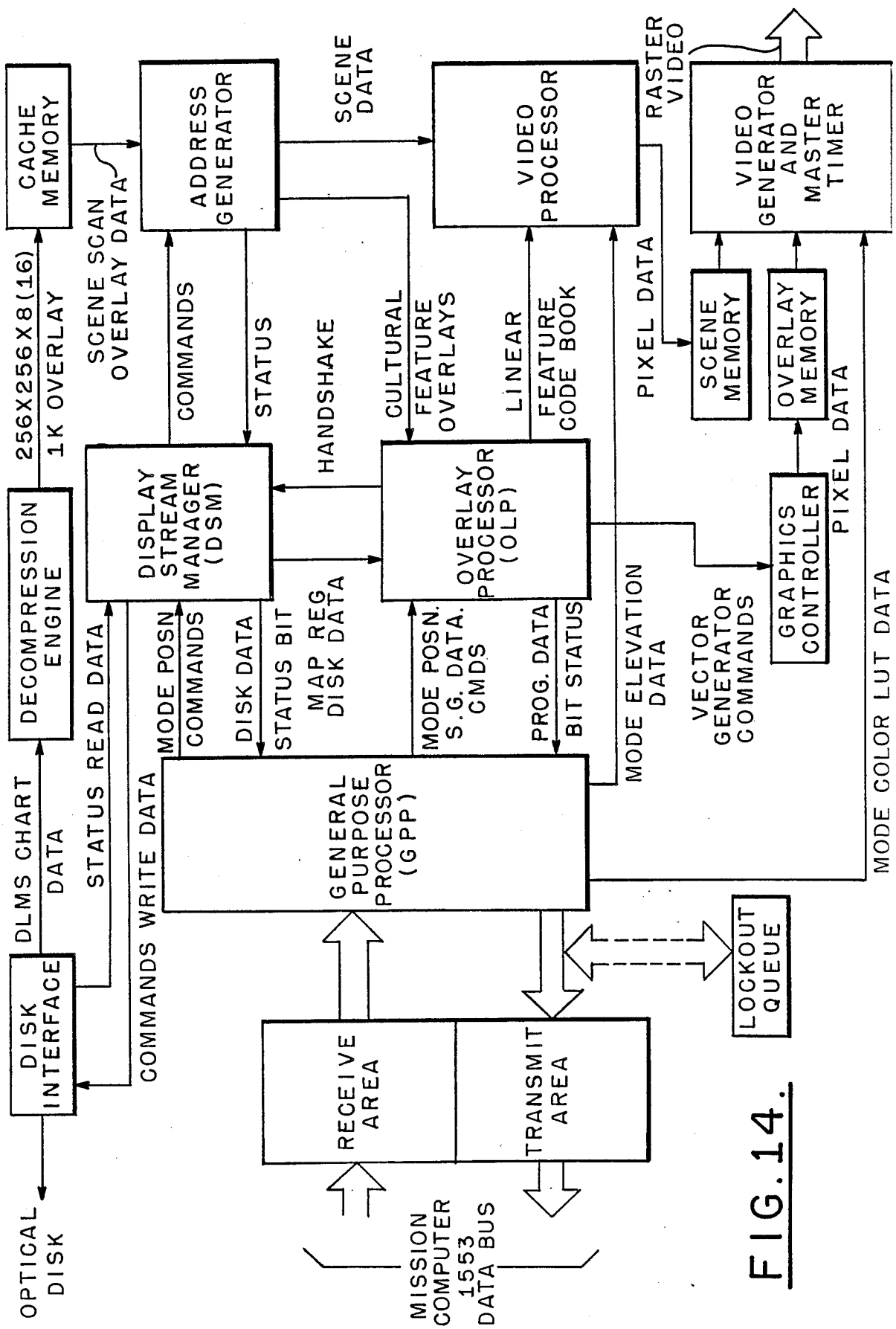
FIG. 14 is a top-level diagram of the software system data flow.
Figure 15:
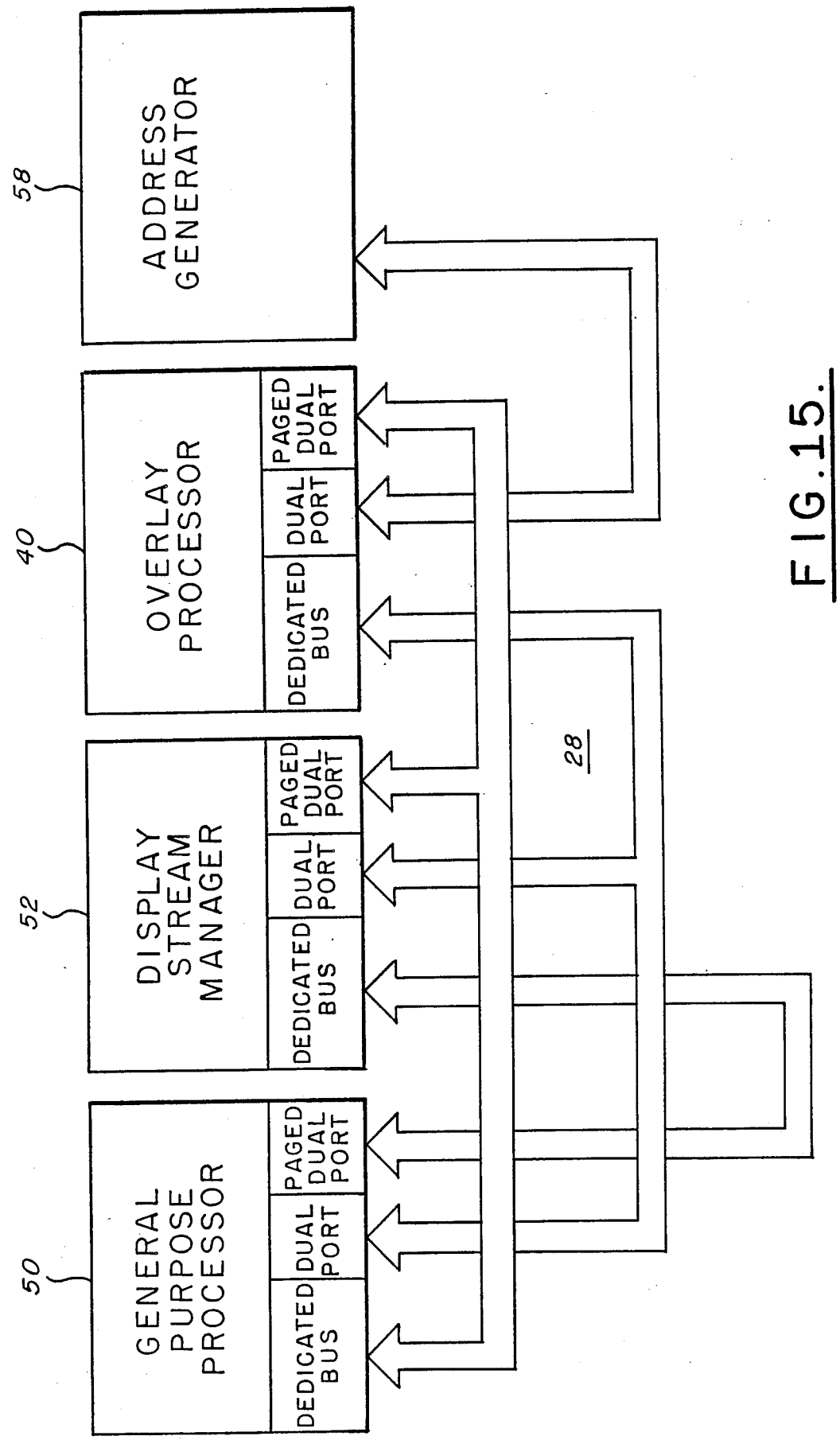
FIG. 15 shows the interprocessor bus communications.
Figure 17:
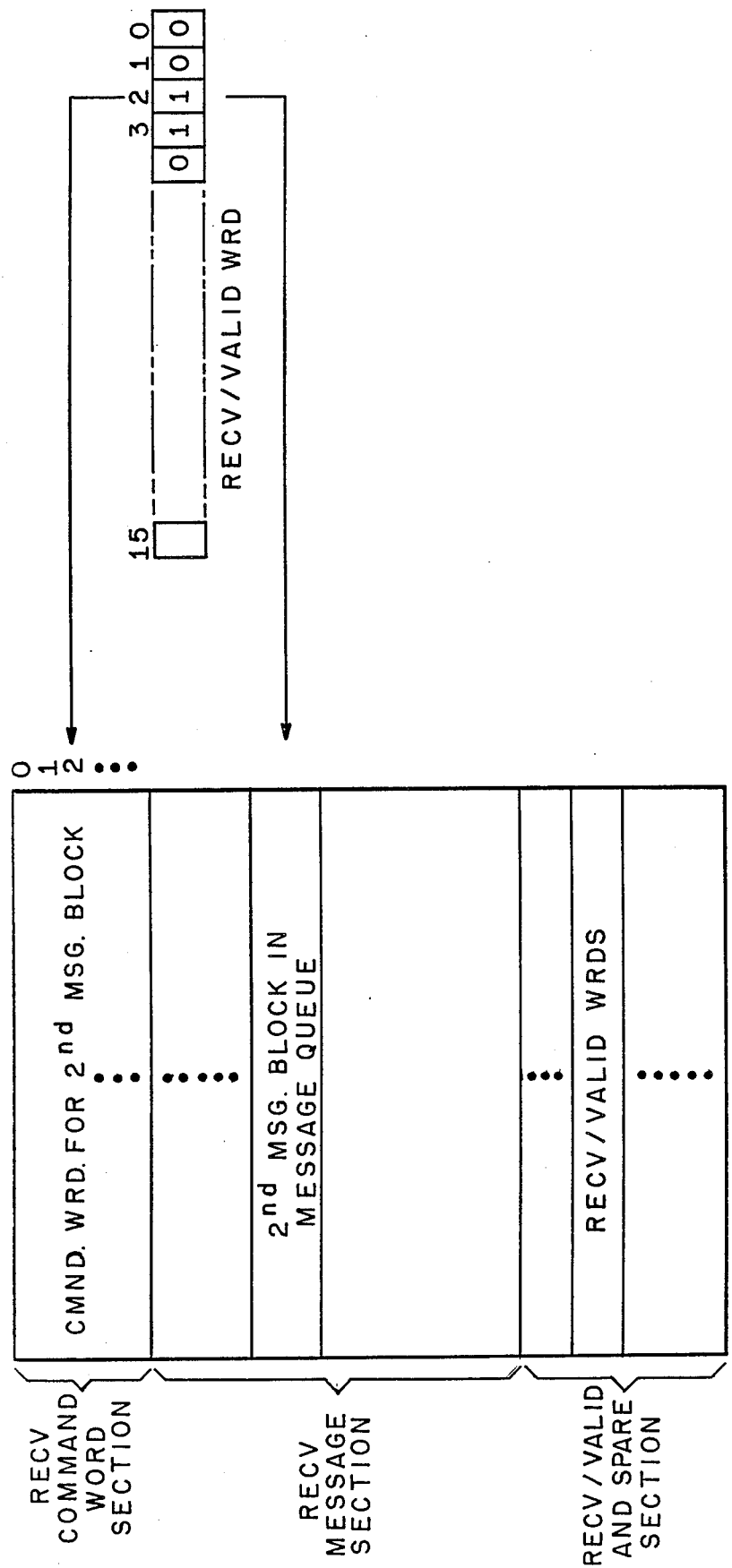
Figure 21:
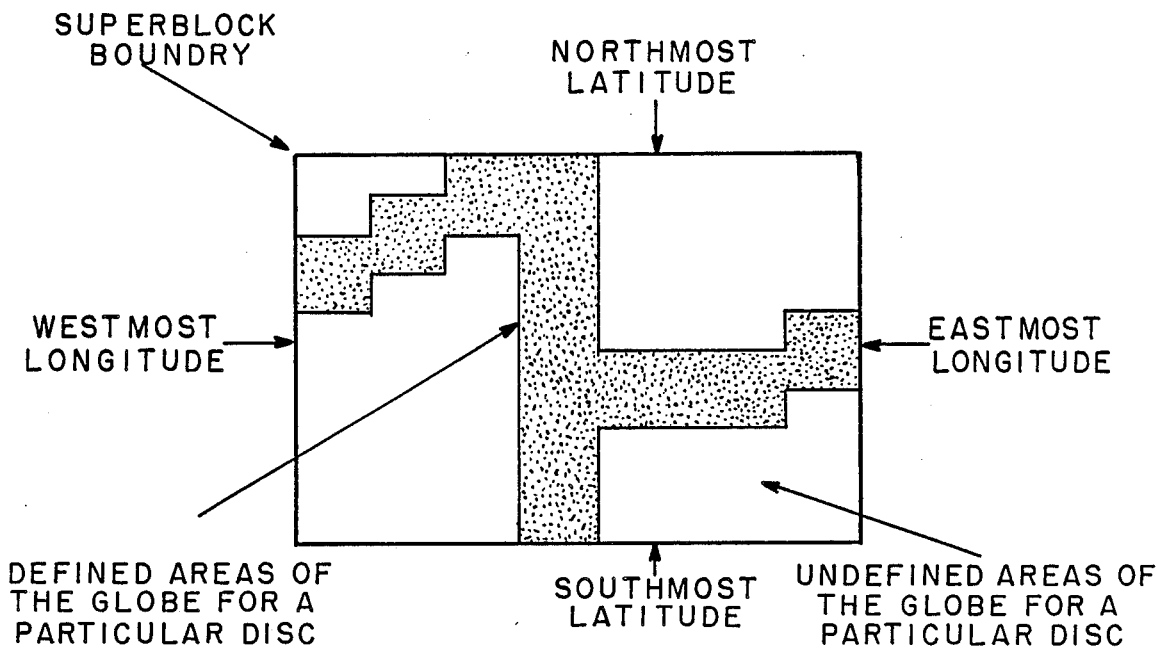
Figure 25:
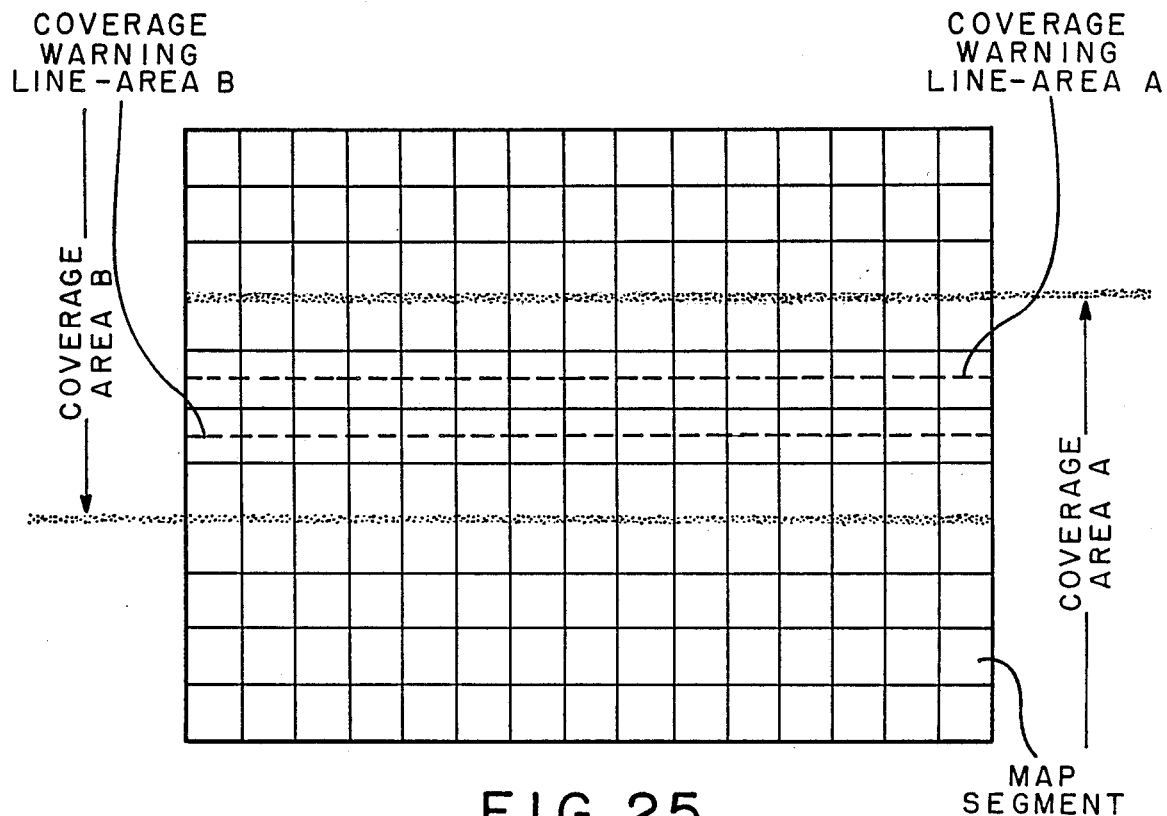
Figure 22A:
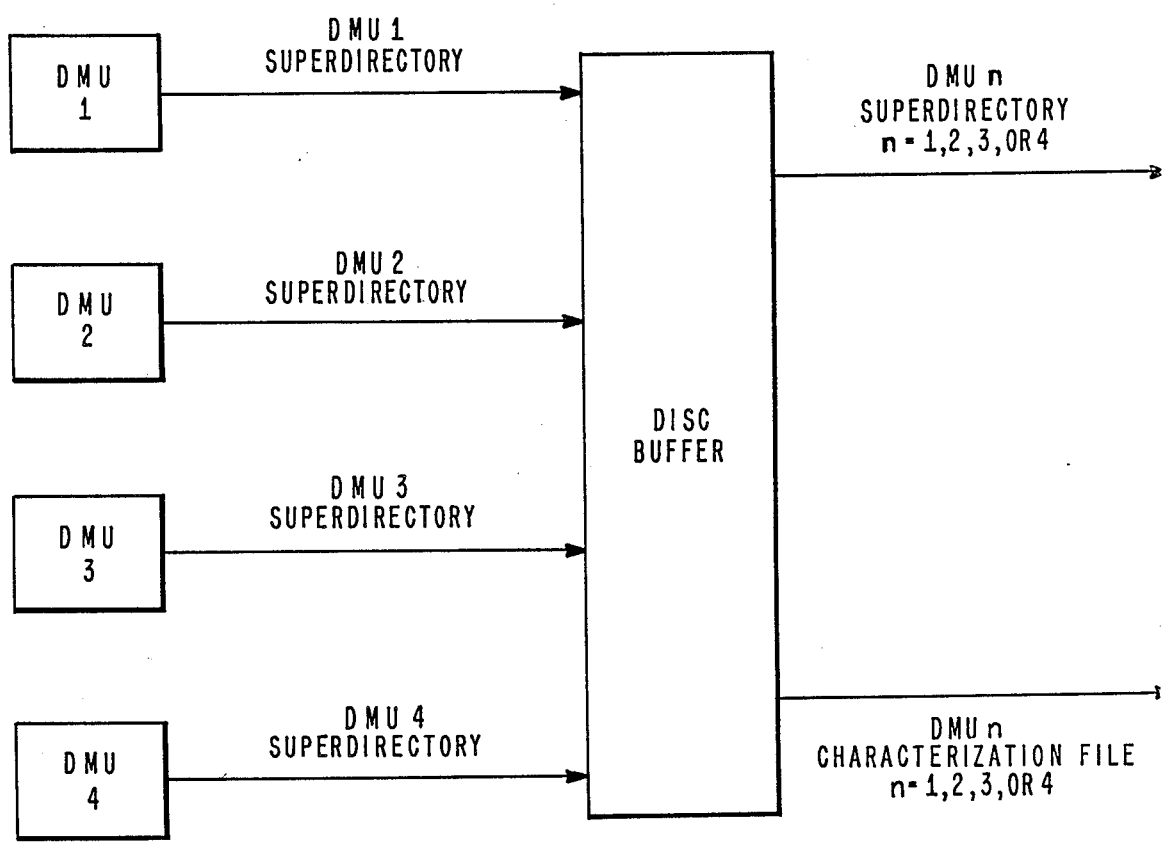
Figure 22B:
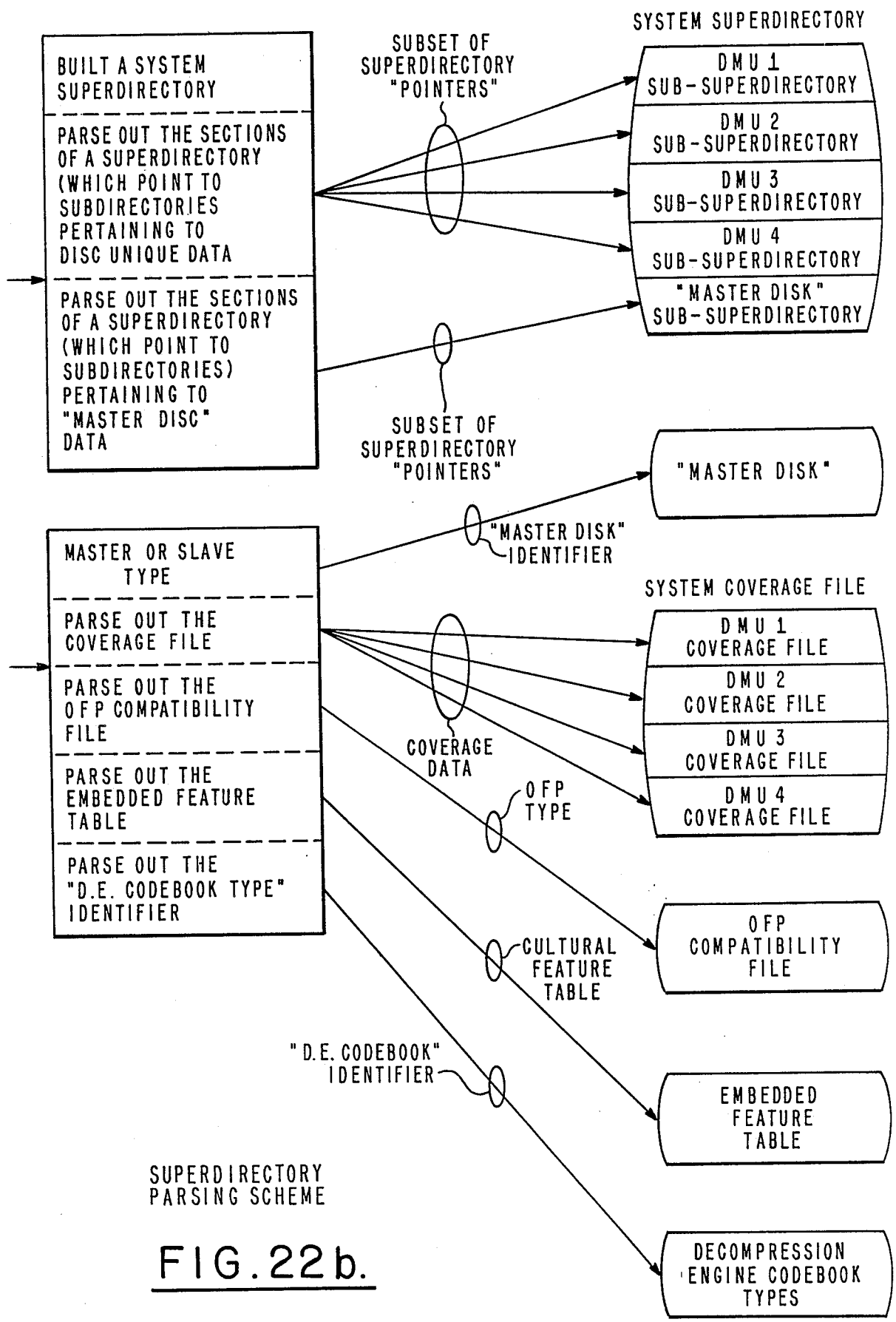
Figures 28, 30:
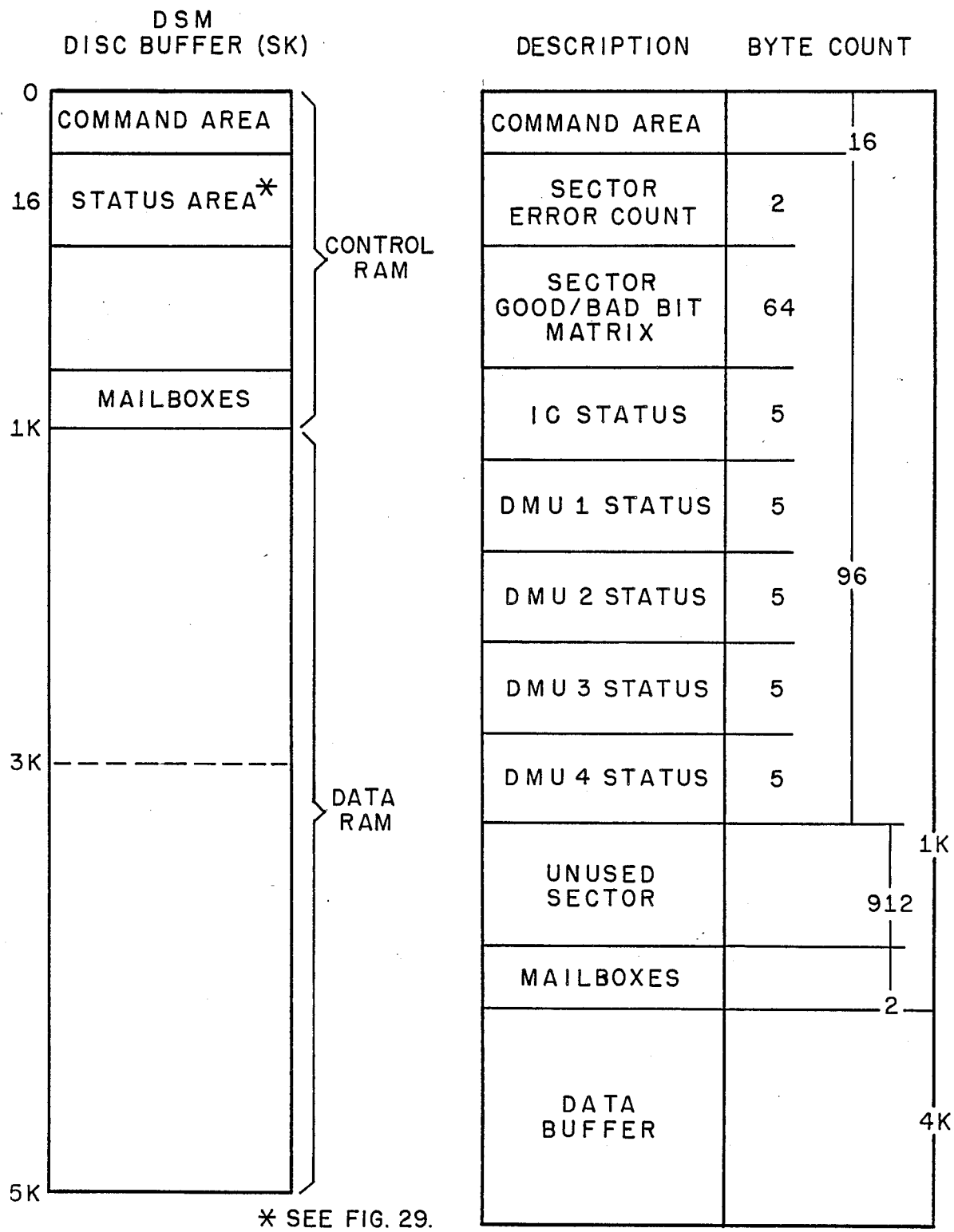
Figure 29B:
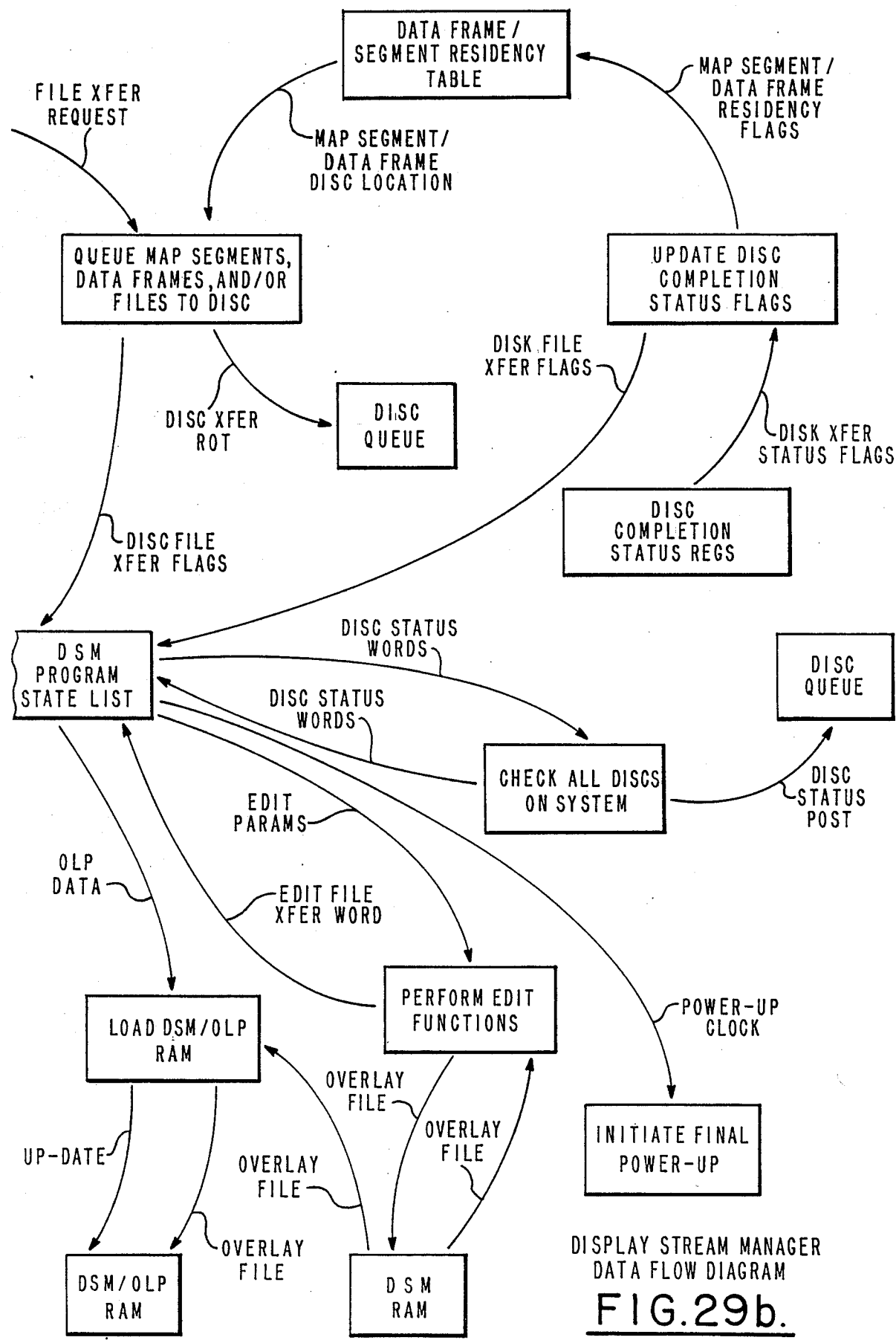

FIG. 14 shows an overview of the top-level data flow in the system of FIG. 1. FIG. 15 shows the bus interconnections between the general purpose processor 50, display stream manager 52, overlay processor 40, and address generator 58. Appendix A is a description in text form of the data flow between the various processors. FIGS. 16-29 relate to Appendix A and are described therein.

Figure 2:
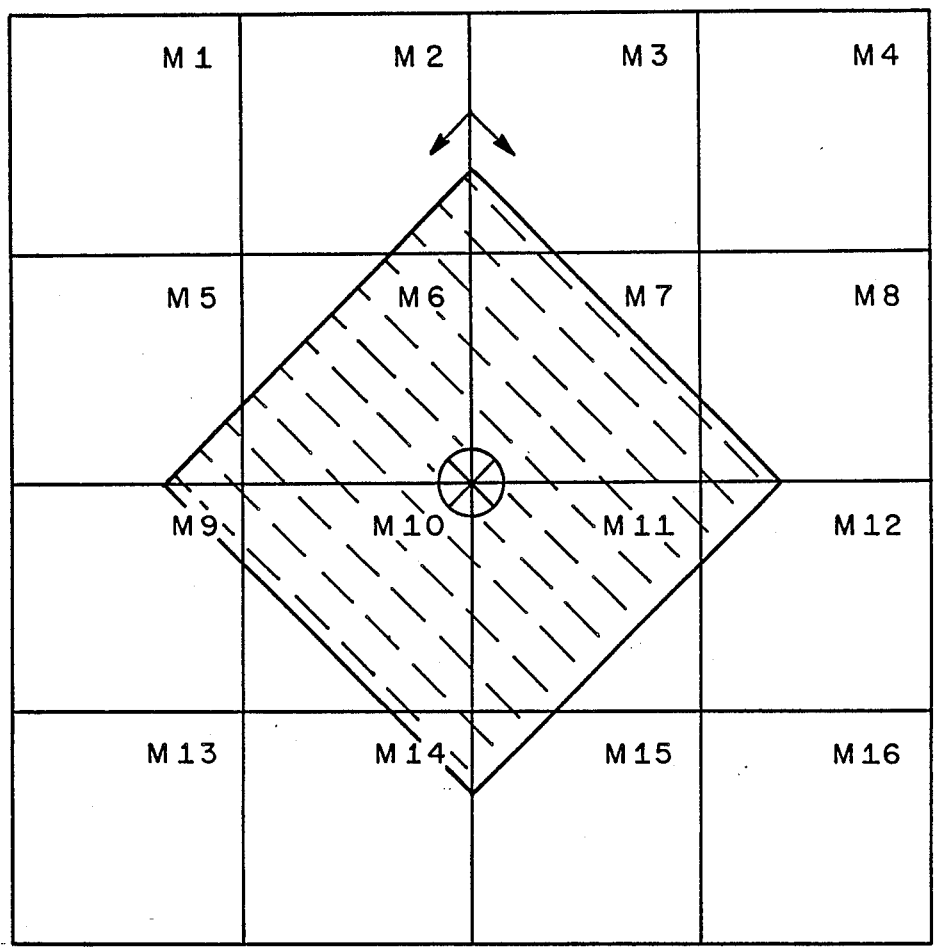
FIG. 2 is a detail of the cache memory image plane.

Referring now to FIG. 2, the Cache Memory is a group of 16 memory segments M1-M16, each logically organized in a 256×256×8 bit array. The number of storage segments provided is substantially less than the number of segments necessary to store a complete map by virtue of the cache memory addressing scheme. Since a typical scene requires 512×512 pixels, and 8 bits for the color descriptors, four segments are required to make up a bit-mapped scene in north-up mode. The additional segments are required to assure that as the display is rotated (for trackup displays) and translated (for aircraft motion), there is sufficient memory available to support the display. Thus, in FIG. 2, segments M2, M3, M5, M6, M7, M8, M10, M11, M14, and M15 are required for the rotated display. Segments M1, M4, M13, and M16 are unused. Each segment in the cache is individually controlled and can be allocated to the display stream bus 51 for loading in data off the optical disk 12, or to the high speed bus 28 for loading the scene memories. When being loaded by the optical disk, the memory is logically configured as 64K bytes allow optimum data transfer from the disk with a minimum of mapping. When supporting the scene memories, the memory is configured as a 256×256×8 image plane. Each cache segment is logically configurable with respect to its physical position within the overall image plane.

In operation, the aircraft's current position is always taken to be the origin of the cache image plane. Thus, as the aircraft flies towards one edge of the display space, a cache segment that was behind the aircraft may be updated with new data from the optical disk and logically replaced in front of the aircraft's current position.

FIG. 3 shows the physical cache memory addressing space and the arrangement of the cache memory buffer segments therein. Thus, the address space is seen to be configured in the form of an X, Y coordinate system with an origin 0,0. The display system manager 52 has the capability in the absolute cache memory addressing space to address a total of 256 buffer segments. There are n rows of buffer segments and m columns of buffer segments which in a 256×256 word array encompass addresses 0,0 through F,0 along the X direction and 0,0 through 0,F along the Y direction. It is a feature of the present invention that each of the buffer segments $x_i, y_j$ are randomly programmable elements which may be dynamically relocated in the overall image plane to accomodate changes in the aircraft's coordinate position. Since each buffer segment is individually addressable, the cache memory 24 is responsive to control signals from display stream manager 52 to simultaneously read data out of a first buffer segment portion and write new data into a second buffer segment portion. It may be seen from FIG. 3 that each buffer segment is independently programmable with respect to its logical position within the overall physical X, Y coordinate system addressing space to form a predetermined image plane and thus that each buffer segment is addressable both by its absolute position in the physical address space and by a logical position within the virtual image plane. Each buffer segment has 64K storage elements, wherein each storage element can store therein at least one bit of map data or overlay data and each storage element has a corresponding logical address within the physical address space. Preferably, the cache memory buffer segments will be configured in a plurality of parallel image planes having corresponding storage elements in each plane and wherein each corresponding storage element in each plane has the same address for collectively storing a digital word representative of color and intensity of a displayed pixel. It is the function of the display stream manager 52 to keep track of the logical and physical positions of each buffer segment and to program the cache memory in accordance with the aircraft coordinate position.

Figure 4A:
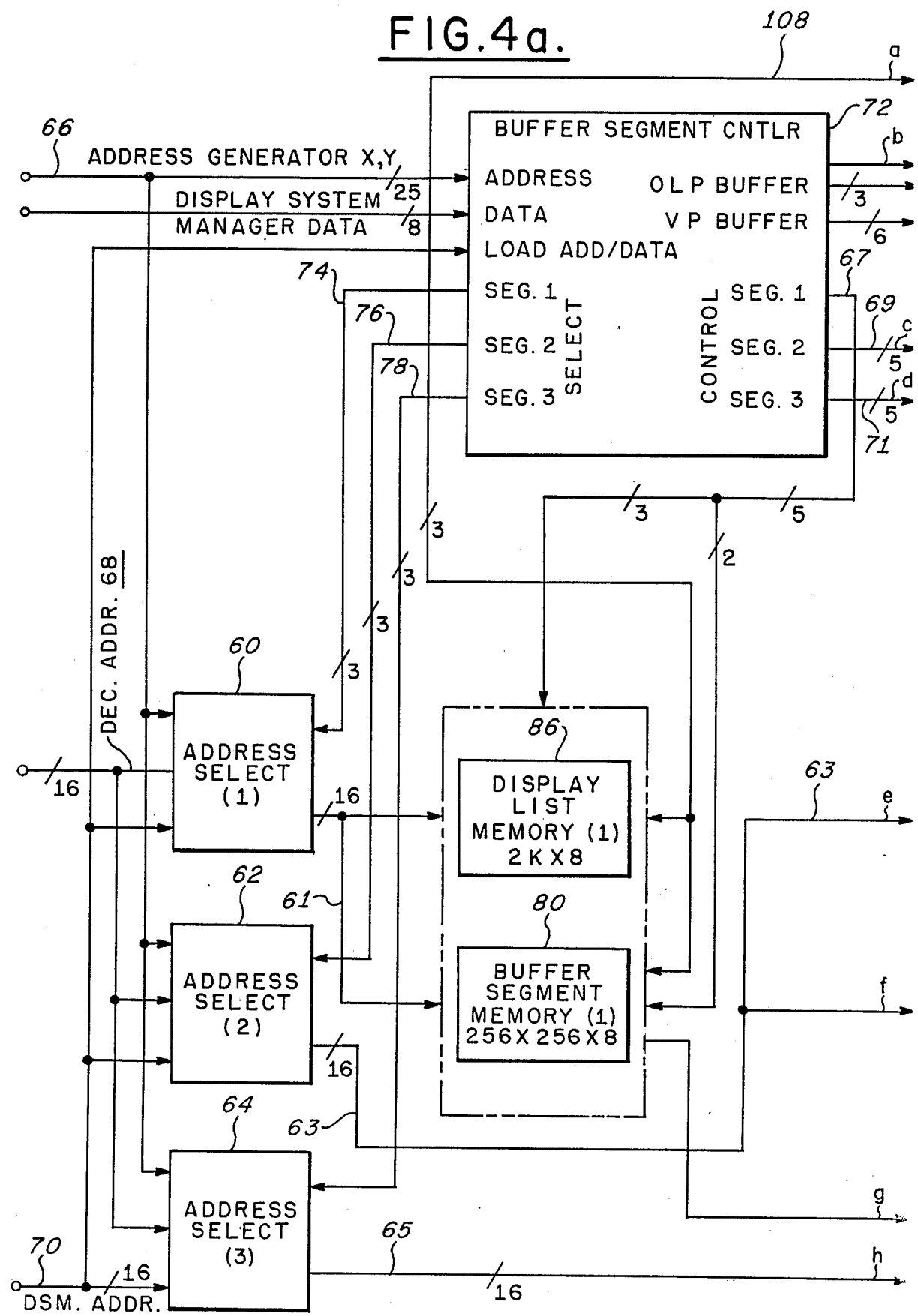

FIG. 4 discloses a block diagram of the cache memory. It comprises essentially four major areas: the input address selectors, the buffer segment and display list memories, the input/output data buffers, and the buffer segment controller gate array. FIG. 4 shows three buffer segments and supporting circuitry out of the 18 segments utilized in the present invention. The additional buffer segments and supporting circuitry are identical in structure and operation to that of FIG. 4.

The cache memory functions as a dual-port memory comprised of 18 segments, with each segment being logically independent and under control of the display stream manager 52. Digital data is transferred to the buffer segments one segment at a time, and a segment of data bits to update the scene or overlay memories is sequentially scanned over a plurality of the segments which are logically organized in accordance with the physical address space, but not necessarily contiguously within the array of buffer segments. While one segment or display list is being loaded with information off the optical disk unit 12 through decompression 23, another segment can be accessed by the address generator 58 for transferring data to the video processor 30. Individual segment control is processed by the display stream manager through the loading of dedicated mapping and control registers located in the buffer segment controller. The cache memory also contains 18 display list buffers which hold the feature overlay information associated with each of these 18 segments.

To accomodate an alternate display mode where additional information is required, the segments may be configured as a total of nine segments, each 16 bits deep. Thus, the cache memory physical address space may be configured either as a 256×256×8 or 256×256×16 image plane.

The input address selectors provide for the selective addressing of a buffer segment or display list by the address generator, mass memory interface or display stream manager under the control of the buffer segment controller 72. The buffer segment controller 72 uses three control lines per segment to select which function will address any given buffer segment or display list. Address selectors 60, 62, and 64 are selectively coupled to address generator 58 on line 66 for reading data corresponding to $x_i$ and $y_j$ locations in cache memory. The $x_i$ and $y_j$ addresses are read from a 24 bit address bus 66 of which 12 bits form each address of the cache memory. Each 12 bit address is comprised of a 4 bit segment tag and an 8 bit address in the buffer segment or display list. (See FIG. 3). The address selectors are also coupled to the decompression engine 23 via 16 bit address bus 68 to address the total buffer segment address space of 64K words. A 16 bit address bus 70 is also coupled from the display stream manager 52 to allow the display stream manager to address the total buffer segment address space of 64K words.

The buffer segment and display list memory is organized as follows. Each buffer segment 80, 82, 84 consists of eight 64K 1 static rams organized as 256×256×8 bits deep. Each buffer segment is associated with a corresponding display list memory 86, 88, 90, in which is stored feature overlay information and which is 2K×8 in size. The address selectors 60, 62, 64 are respectively coupled via a 16 bit bus 61, 63, 65 to a corresponding display list memory and buffer segment memory. Read/write and chip enable signals are issued from the buffer segment controller 72 via a 5 bit bus 67, 69, 71 to control access to the memories Three control lines are used to energize the display lists: a read/write line, an output enable line, and a chip select line that places the memory in low-power standby when not being addressed. Each buffer segment has two control lines: a read/write line and a chip select line that places the buffer segment memory in low-power standby when not being addressed. Buffer segment memory 80 is coupled via an 8 bit bus 92 to an output buffer 94. Output buffers 96 and 98 are correspondingly coupled to their respective buffer segment memories. Output buffers 94, 96, and 98 are coupled in common via a 16 bit bus 106 directly to the video processor 30 to provide display lists or buffer segment data during address generator read operations. Buffer 100 receives buffer segment and display list data via bus 108 for energizing the overlay processor 40. Buffers 102 and 104 similiarly receive data from their associated memories for coupling to the overlay processor. Buffers 100, 102, and 104 also accept data from the decompression circuit 23 to be written into selected buffer segments and display lists. By using combinations of control signals available from the buffer segment controller the input/output data buffers are selectively enabled.

Figure 5:
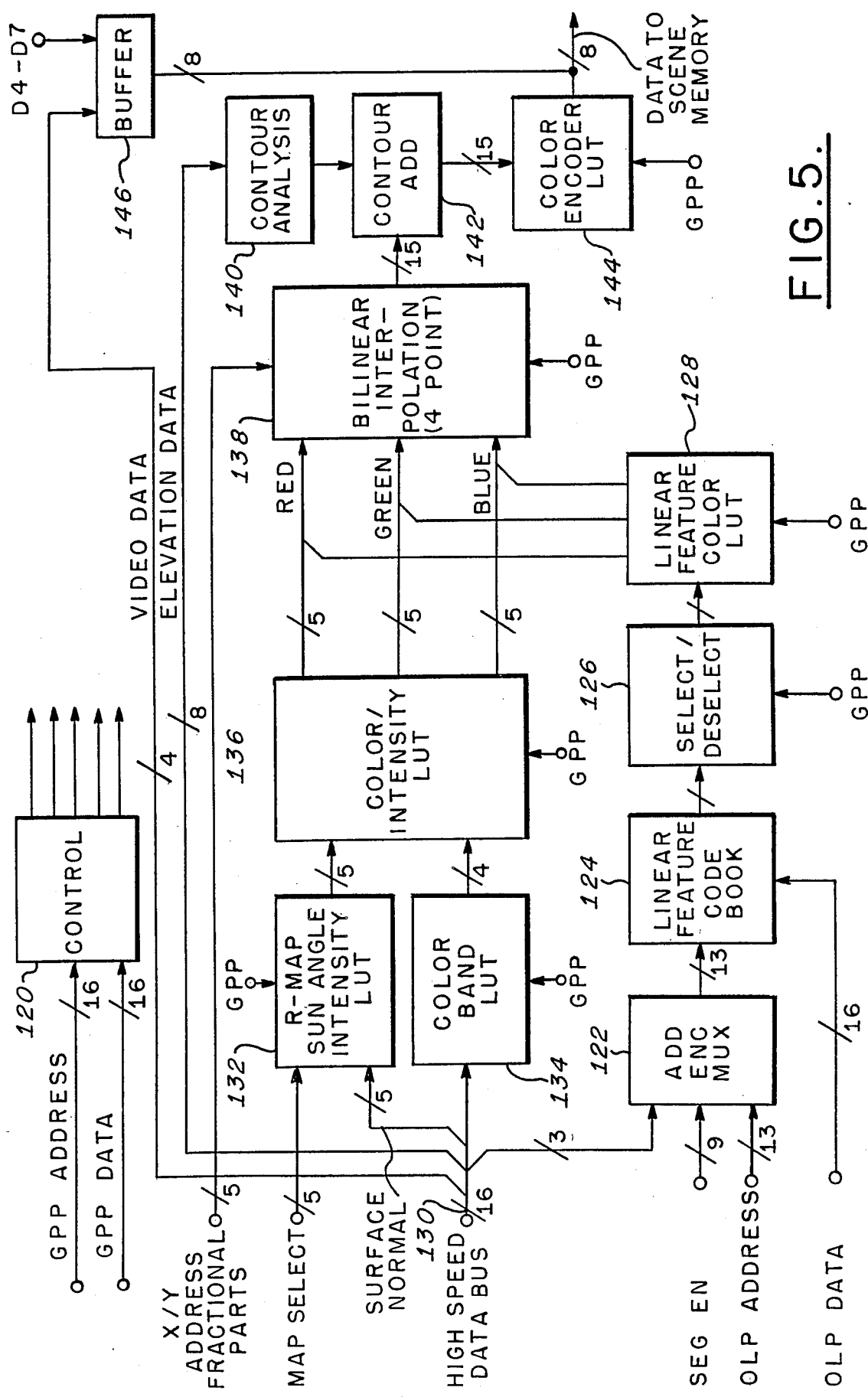
FIG. 5 is a block diagram of the video processor.

FIG. 5 shows a block diagram of the video processor circuit. The video processor takes video data from the cache memory, x,y coordinate addresses from the address generator, address and data signals from the overlay processor, and control signals from the general processor to produce an 8 bit color word to be written into the scene memory. The video processor processes linear feature data to determine if a linear feature is to be written in a given location. It also determines the color of a location based on the elevation of the terrain. The color of a specific elevation is programmable by the general purpose processor through the use of lookup tables to be described. When the color value at a desired location falls on a non-integer location, a bilinear interpolation is performed between four neighboring points provided by the address generator to determine the actual color value at the location to be written. A suitable circuit for bilinear interpolation is given in U.S. patent application No. 83,400, Color Processor for Digital Map Display System. The video processor is also used to determine when a contour line is to be written. Contour lines are used to delineate changes in elevation in the manner described in U.S. patent application No. 055104, Digital Contour Line Generator. The color of a contour line is programmable by the general purpose processor. Linear features and contour lines may be selectively enabled so as to assign a priority to a desired form of display. The video processor also produces sun shading as a function of reflectivity maps representative of the sun azimuth in elevation and the aircraft heading. A further feature permits displaying dynamic color zones representative of ranges of elevation, either in absolute terms with respect to the terrain elevation, or relative to the aircraft altitude. The signals from the color band generator and the sun angle intensity may be combined to derive a composite signal in red, green, blue primary color format. Map data may also be passed directly to the scene memory where it is not desired to display the color features described above, or this map data may be disabled giving the linear data priority over the map data at that location.

As shown in FIG. 5, the operation of the video processor is controlled by the general purpose processor via address and data signals applied to decode and control latch 120. The control status will strobe the control latch in a conventional manner. The video processor includes a linear feature generator comprised of an address encoder switch 122, a linear feature code book 124, a select/deselect switch 126, and a color lookup table 128. The lookup table provides a powerful mechanism for rapidly changing the definition of display pixel values without changing any display data. For this purpose, lookup table 128 is coupled to the general purpose processor which provides programming of the desired color table in a conventional manner. The encoder switch 122 receives address signals from the overlay processor for selecting one of nine segments from code book 124 and segment enable command signals from the cache memory. It is also coupled to the high speed data bus 130 for receiving linear feature overlay commands which will select one of a plurality of linear feature combinations stored within code book 124. Code book 124 is programmed by data from the overlay processor and typically stores up to 30 possible linear features. Each linear feature within the set can be enabled or disabled to form any combination of linear features to occur at any elevation point. The linear features may also be arranged in order of priority. The code book is comprised of a random access memory programmable by the overlay processor. When the address generator loads new segments of data from the optical disk to the cache memory, it will also send a display list describing the combination of linear features in each segment to the overlay processor. The overlay processor will then update the code book based on the display list it receives from the address generator. The outputs of code book 124 are coupled to switch 126. Switch 126 may be comprised of a mask which is enabled by the general purpose processor. Each linear feature then can be masked out independently of other linear features. If desired, the output from switch 126 may be applied to a priority encoder (not shown) whereby when a linear feature is masked out the linear feature with the next highest priority will be displayed if it is not masked out and is enabled. Thus, when a contour line appears at the same elevation point as a linear feature, the one with the highest priority will be displayed. The switch outputs or priority encoder outputs are then applied to a linear feature color lookup table 128. Table 128 produces the color of the individual linear features in a red, green, blue primary color form. Typically, a 5 bit code is used, providing 32 color values.

Dynamic sun angle shading is used to control the intensity of the colors, thus simulating shading of the terrain. A plurality of reflectivity maps are stored in lookup table 132. The general purpose processor provides a map select signal for selecting one of the previously stored maps. The processor may also load the lookup table with the desired reflectivity maps. Based on the sun azimuth, sun zenith, and aircraft heading, the general purpose processor selects one of the prestored reflectivity maps. Selected surface normal lines derived from the data bus are then applied to map 132 to select one of 32 intensities within the map. The output of the map is in a form of a 5 bit binary code describing the intensity.

Elevation color bands are provided by lookup table 134. This circuit utilizes the elevation data at each pixel location to perform a table lookup on hue. Aircraft altitude may also be considered to obtain an offset into the table s that the hue tracks over the terrain relative to the aircraft altitude. Thus, the hue may be defined either in terms of absolute altitude of the terrain or relative altitude of the aircraft with respect to the terrain. For programming the lookup table 134, it is coupled to the general purpose processor. Color bands define zones of a predetermined range of elevation. The elevation at each displayable pixel is applied as an address to the color band lookup table 134. Typically, table 134 is comprised of a 256×4 RAM. In relative mode, the lookup table is updated at the borders as the aircraft changes altitude.

The outputs from lookup table 134 and reflectivity map 132 are applied to a further lookup table 136. Table 136 combines the intensity and hue to provide a 5 bit output for the red, green, and blue primary colors with a range of 32 intensities for each color. The three primary outputs are then applied to corresponding bilinear interpolation circuits 138, for an interpolation in each color.

A further feature is provided by contour analysis circuit 140. The contour line circuitry uses an edge detector and averages the elevation data for comparison with one of a plurality of lookup tables with predetermined contour line spacing. The contour line at a selected pixel location may be suppressed or may overwrite the pixel to allow for instant select/deselect on contour lines, by means of circuit 142. Circuit 142 is comprised of a conventional enable/inhibit register. The output of register 142 is applied to a color encoder lookup table 144 which reduces the 15 line data input to an 8 line data output, which is then applied to the scene memory. When desired, the linear features, reflectivity map, color banding, and contour analysis may be deselected and video data applied directly to the scene memory through buffer 146.

Figure 6:
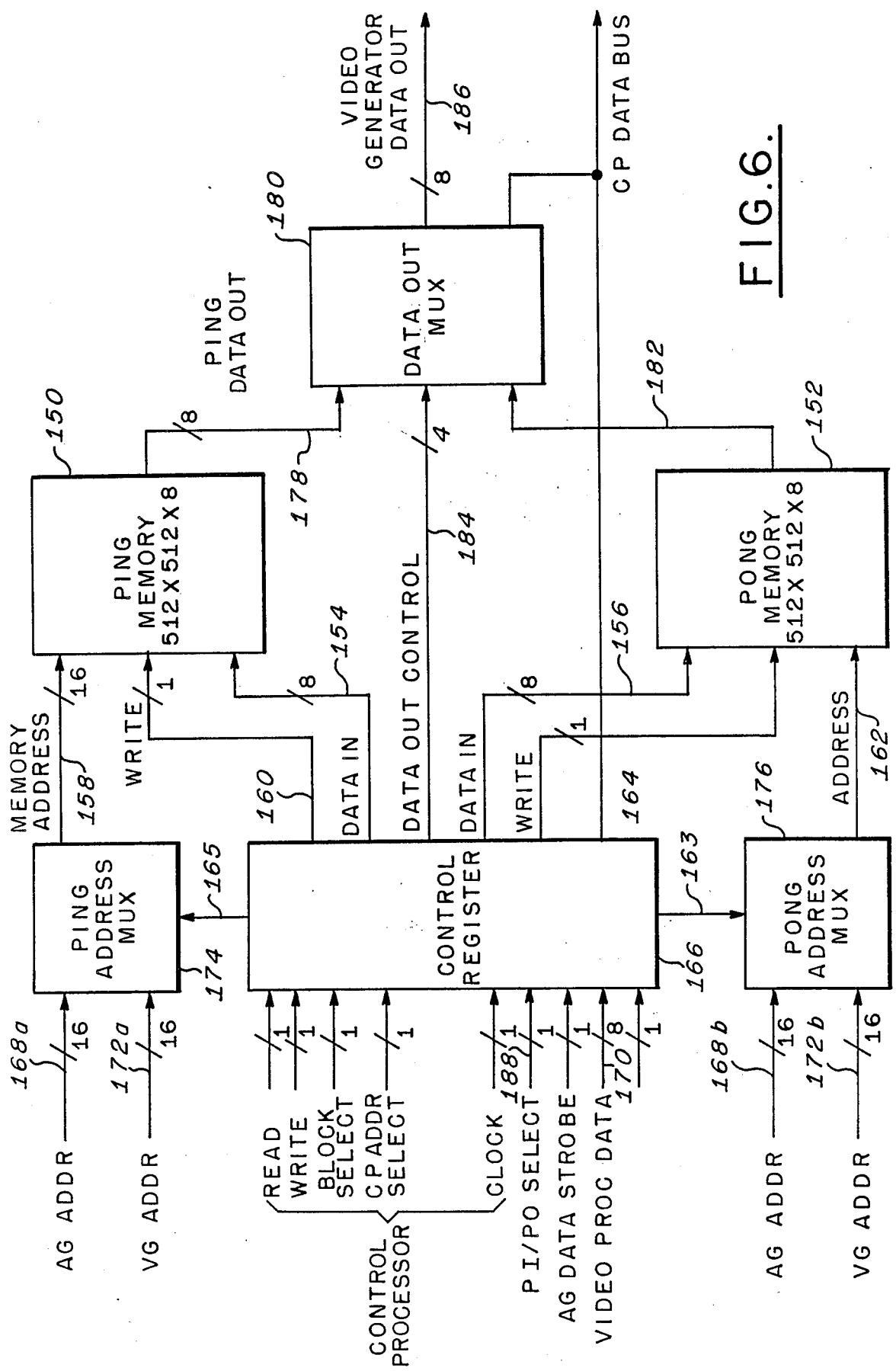
FIG. 6 is a block diagram of the scene memory.

Referring now to FIG. 6, a scene memory apparatus implemented in accordance with the present invention is illustrated. The apparatus includes a pair of full-field refresh memories 150 and 152. Each of the memories 150 and 152 comprise, for example, 512×512×8 bit static RAM memories, where each address represents a pixel on the video display. Input data to be written into each of the memories 150 and 152 are provided on busses 154 and 156 respectively. Memory 150 is addressed by bus 158 and receives a write command on line 160. Memory 152 is addressed by bus 162 and receives a write command on lead 164. In the embodiment of the invention illustrated in the figure, 484×484 pixels and 242×242 pixel display modes are supported. A ping-pong control signal 163,165 from control register 166 is used to assign a memory to the address bus 168a or 168b and the video processor data bus 170 while the other memory is assigned to the video generator address bus 172a or 172b. Ping-pong operation is effected between the full field memories 150 and 152 by sequentially reading in data to one memory while reading out the stored data in the second memory and then updating the second memory with new frame data while reading out the first memory. Addresses for writing data into ping address multiplexer 174 and pong multiplexer 176 are provided on busses 168a and 172a, and 168b and 172b, respectively. Control register 166 receives commands from the control processor including read and write signals, block select, address select, and a clock signal. A ping-pong select signal which causes the memories to alternately and sequentially read in, store and read out data is provided by the timing generator. A strobe pulse for reading in video processor data is provided by the address generator. The output of ping memory 150 is coupled on a bus 178 to a multiplexer 180. The output of pong memory 152 is coupled on bus 182 to multiplexer 180. The outputs on busses 178 or 182 are selectively controlled by a signal from control register 166 on bus 184. Multiplexer 180 provides output data from memory 150 or memory 152 to the video generator on bus 186.

In operation, the PI/PO select line 188 is applied to control register 166 to determine whether the address generator or the master timer, which generates the video generator address, will address the memory. Thus, if the PI/PO select line is high, the address generator has control of the ping address bus 168a or 168b, while the master timer has control of the pong address bus 172a or 172b. During this time, video processor data is written from bus 170 into the ping memory 150 while data is read from the pong memory 152 into MUX 180 and to the video generator. When the PI/PO select line goes low, the control register 166 switches memories and the address generator then has control of the pong address bus while the master timer has control of the ping address bus.

In the present invention, each of the memories 150 and 152 is organized into four banks of 512×128×8 memory.

The sequential operation is controlled by the control register 166 which can be read or written into by the control processor.

Except for the number of bit planes, the scene memory 26 and overlay memory 44 are identical in architecture. While the scene memory implements two double-buffered 8-bit display planes, the overlay memory utilizes two sets of 4-bit memory planes, one for each set of scene memory planes. Each overlay memory array is 512×512×4 with an effective viewable display of 484×484 pixels. Each overlay memory is capable of being assigned to the overlay processor 40 for update or to the digital video bus 32 for refreshing the CRT display.

Graphical data from the graphics generator 42 can be written into any combination of memory planes within the overlay memory 44. This allows planes to be assigned to different predetermined types of symbology which can be enabled or disabled by setting a control bit. The display stream manager 52 controls the bit plane options and communicates that status to the overlay processor.

Display refresh is controlled by the master timer 46, which synchronizes scene memory readout with the overlay memory readout to support the display refresh requirements. Four adjacent pixel locations may be read simultaneously and loaded into shift registers, which are then clocked at the video pixel rate for reading out the stored data. A ping/pong line from the master timer 46 controls which set of memory is accessed by the video generator 34 or the graphics generator 42.

The overlay memory 44 interfaces with the video generator 34 via 4 data lines. The master timer 46 feeds 18 address lines and a ping/pong line. The interface with the graphics generator 42 is via 4 data lines, 18 address lines, a read /write line, a control strobe line, a reset line, and a data valid line.

Figure 7:
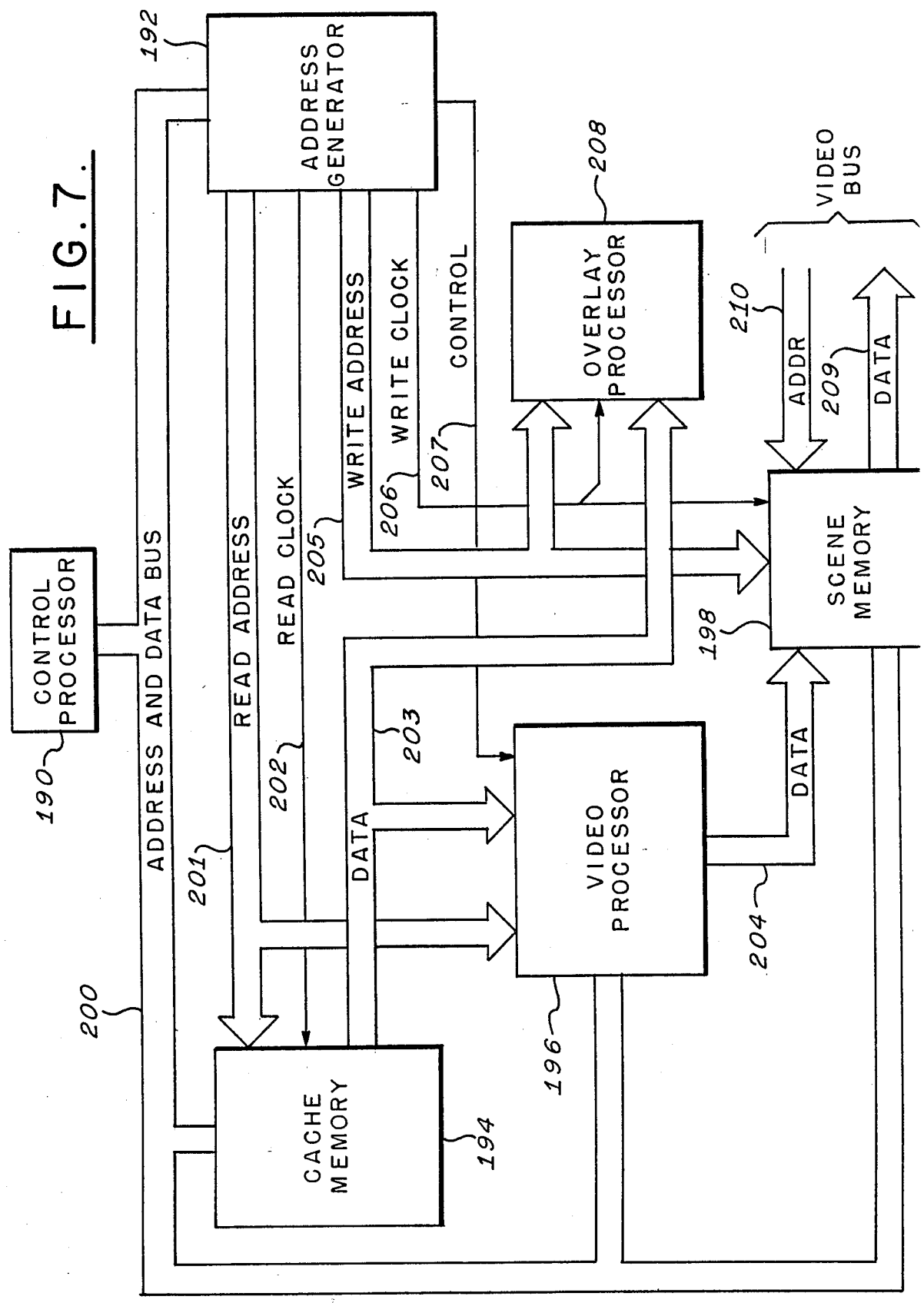
FIG. 7 is a schematic showing the high speed bus interface with the address generator.

The circuit of FIG. 7 shows the interconnection of an address generator 192 to the map display system. Address generator 192 is coupled via address and data bus 200 to control processor 190. The bus 200 also provides address and data signals and receives status information from cache memory 194, video processor 196, and scene memory 198. Address generator 192 provides read address commands along the x and y coordinates via bus 201 to cache memory 194. The data read out of cache memory 194 is coupled into video processor 196 and overlay processor 208 via data bus 03. Address generator 192 also provides a read address via bus 201 to video processor 196. When video processor 196 has completed its operations on the data received from cache memory 194, it provides the processed data via bus 204 to scene memory 198. Scene memory 198 receives a write address via bus 205 from address generator 192 and provides the data from video processor 196 on an output bus 209 at addresses determined by a read signal rom video generator 34 on address bus 210. A read control signal is provided on line 207 by address generator 192 and a write signal via line 206 to scene memory 198.

Figure 8:
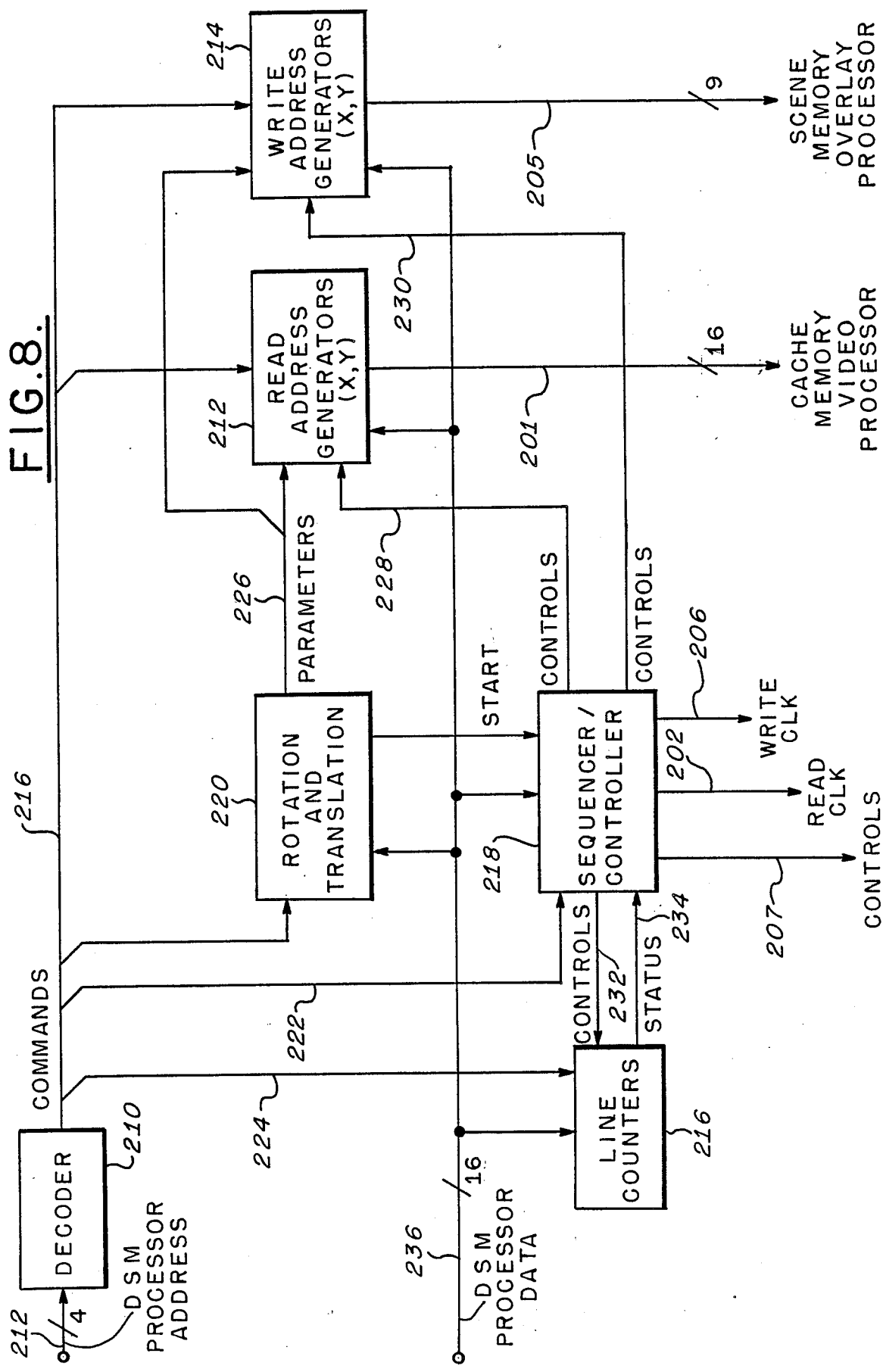
FIG. 8 is a block diagram showing the structure of the address generator.

Referring now to FIG. 8, the structural details of the address generator 192 are shown in greater detail. Address signals from display stream manager 52 are applied to a decoder 210 via a bus 212. Decoder 210 provides output commands such as initialization of the initial x and y coordinate starting points, aircraft heading, zoom ratio, and initial x and y line count. The address generator consists essentially of four function blocks: a read address generator 212, a write address generator 214, x and y line counters 216 and a state sequencer 218. Coordinate translation coefficients to provide an upper left justified coordinate system within the absolute cache address space and rotation coefficients corresponding to the aircraft heading are provided by circuit 220. These functions may also be provided by the general purpose processor if desired. The commands from decoder 210 are coupled to read address generator 212 and write address generator 214 on bus 216. Further commands to state sequencer 218 are applied on line 222. Line counter 216 receives its initialization commands on bus 224. Functional block 220, which may comprise sine and cosine memories to scale the sine and cosine values provides the computed address parameters to read address generator 212 and write address generator 214 on bus 226. Control signals from state sequencer 218 are applied to read address generator 212 via bus 228 and to write address generator 214 via bus 230. Line counter 216 is coupled to controller 218 via busses 232 and 234. Controller 218 also provides read and write clocks and control signals to the scene memory, video processor, and overlay processor. The output of read address generator 212 is applied to the cache memory 194 and video processor 196 via bus 201. Write address generator 214 provides a write address via bus 205 to scene memory 198 and overlay processor 208. The control processor provides data signals via bus 236 to counter 217, state sequencer 218, function block 220, read address generator 212, and write address generator 214.

Figure 9:
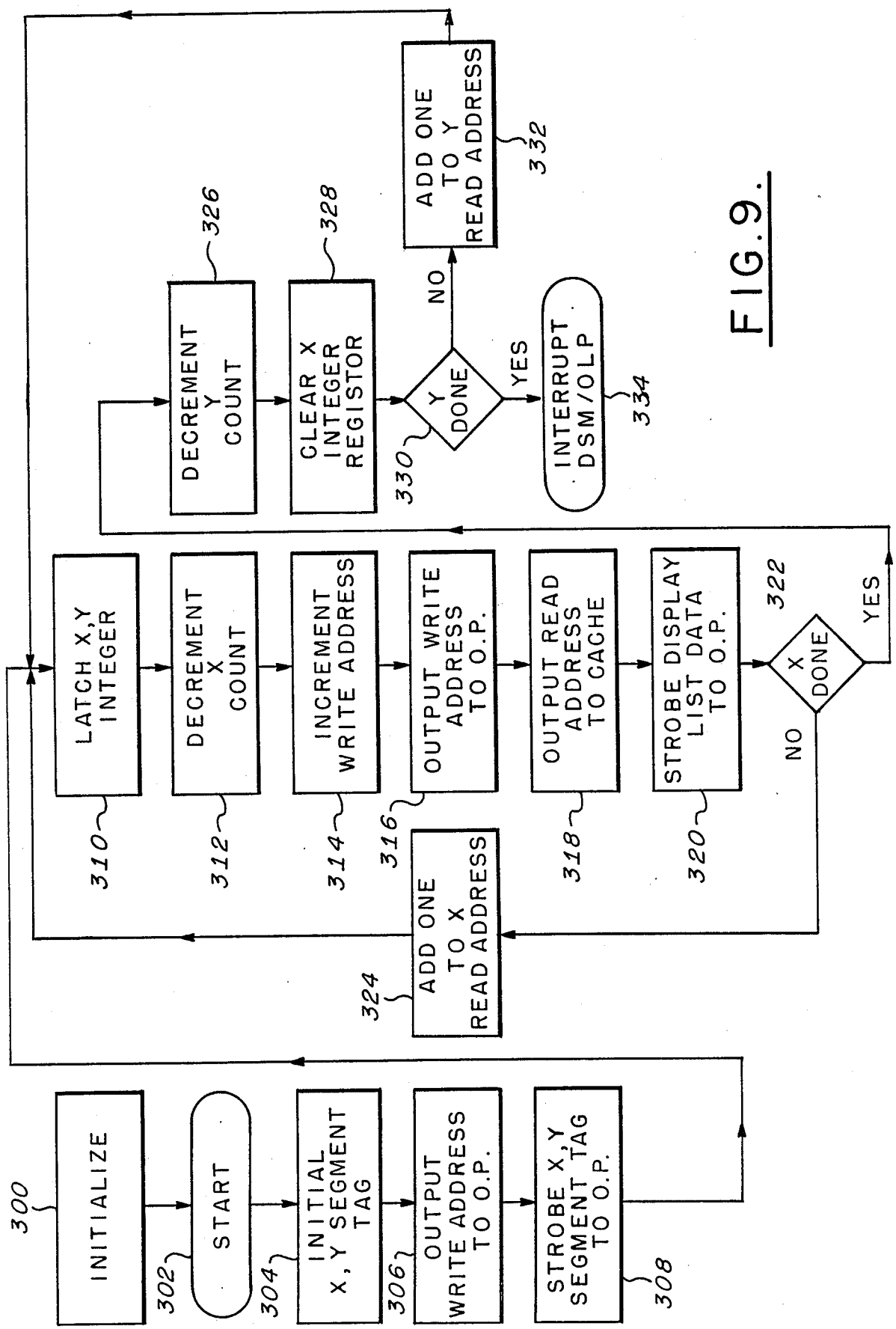
FIG. 9 is a flow chart showing the display list mode of operation of the address generator.

Operation of the address generator may be more clearly understood by reference to FIG. 9a, FIG. 9b, and FIG. 9c, with continued reference to FIG. 8. At the start of each update cycle, the address generator, which receives its control parameters from the display stream manager through the decoder 210, is commanded to perform a display list scan. Typically, nine consecutive 910 byte display lists filling a maximum of 8192 bytes will be transferred to the overlay processor in this mode. The lists are transferred consecutively and hence written in consecutive locations in the overlay processor. A starting address provided by the display stream manager provides a segment tag to the overlay processor which will identify the display list to be transferred with its associated buffer segment. After the segment tag has been given to the overlay processor, the address generator then generates the read and write addresses to transfer the display list information from the cache memory to the overlay memory 44. The read address generators 212 are basically arithmetic logic units which perform a series of incremental adds after receiving a starting point, pixel-to-pixel increment values, and line-to-line increment values from the function block 220. The initial x and y starting points are calculated by the display stream manager using a normalized coordinate system and the aircraft heading information. These initial values are then loaded into the respective x and y address generation circuits. Aircraft heading and zoom information is also provided to the address generator through data bus 236. Function block 220 comprises addressable sine/cosine prom's which determine the direction from the starting point and the increment for each repetitive add operation. The zoom information scales the sine/cosine values. The display stream manager also provides the x and y translation coefficients on bus 236. These coefficients are added to the generated addresses to provide an upper left justified coordinate system within the absolute cache address space. The initial x and y line counts are provided on bus 236 to function block 220, where they are processed and applied to read address generators 212. In the display list mode, typically the x count would be comprised of 256 pixels and the y count would be comprised of 3 lines. In the map display mode, the x count is typically 484 pixels and the y count also 484 pixels. The count is adjusted to allow for the display mode, such as bilinear interpolation, and high resolution or low resolution operational modes. The x and y initial addresses are also loaded into write address generators 214. The write address generators consist of counters used to provide addresses to the scene memory 26 for the transfer of display data or to the overlay memory 44 for the transfer of overlay data. They are clocked directly by the state sequencer 218.

As noted above, the x line counters are decremented after each address pair is generated along the scan line, while the y line counters are decremented after the completion of one entire scan line. The outputs of the x and y counters provide a signal indicating when a block transfer operation is complete. In the map mode, the counters are loaded to take into consideration the additional steps needed to find the four points used for bilinear interpolation.

The state sequencer provides the address generator with all of the necessary control signals and clocks required for its operation during the different modes. After the display stream manager has supplied the address generator with the necessary initialization and control parameters, it starts the sequencer. The sequencer then provides the required internal control signals based upon its multiplexed inputs to generate the addresses and output control signals as necessary for the mode that the display stream manager has loaded into the address generator decoder. The state sequencer provides control signals to the video processor for us in its bilinear interpolation circuitry, clock signals to the cache and scene memories to read or write data, control signals to the overlay processor to transfer display lists, and clock signals to the video processor and to the overlay processor. The multiple inputs include X done, Y done, bilinear done, last line, address generator done, and other related signals.

Referring now to FIG. 9a, after initialization (300), the address generator reads an initial x, y segment tag (304) into the cache memory. It then asserts a write address (306) to the overlay processor and provides a strobe signal (308) identifying the segment tag to the overlay processor. The x, y count is stored in a latch (310) and the x count decremented by one (312). The x write address is then incremented (314) and a write address addressed to the overlay processor (316). The corresponding read address is then applied to the cache memory to extract the list data stored therein (318). The list data is then strobed and applied to the overlay processor (320). The x count is then tested (322) against the predetermined number of pixels in a line. If the x count does not correspond thereto, the read address is again incremented (324) and the cycle is repeated. When the x count is completed, this denotes that a complete line has been scanned and the y count is decremented as shown in FIG. 9c (326). The x register is then cleared to set it up for a new count (328). The y count is then tested (330) and if it has not been completed, the y read address is incremented and a new address latched into the read generator (332). The cycle then continues, as shown in FIG. 9c until both x and y counts have been satisfied (334).

After the address generator has transferred all the necessary display list information to the overlay processor, it will be commanded to transfer the terrain or map data contained in the traversed buffer segments to the scene memory, through the video processor, in a similar manner. Map data will be operated on by the video processor to obtain the data written into the scene memory. In the map mode the fractional x and y address bits generated by the display stream manager are passed to the video processor to be used in the bilinear interpolation circuitry.

Figure 10A:
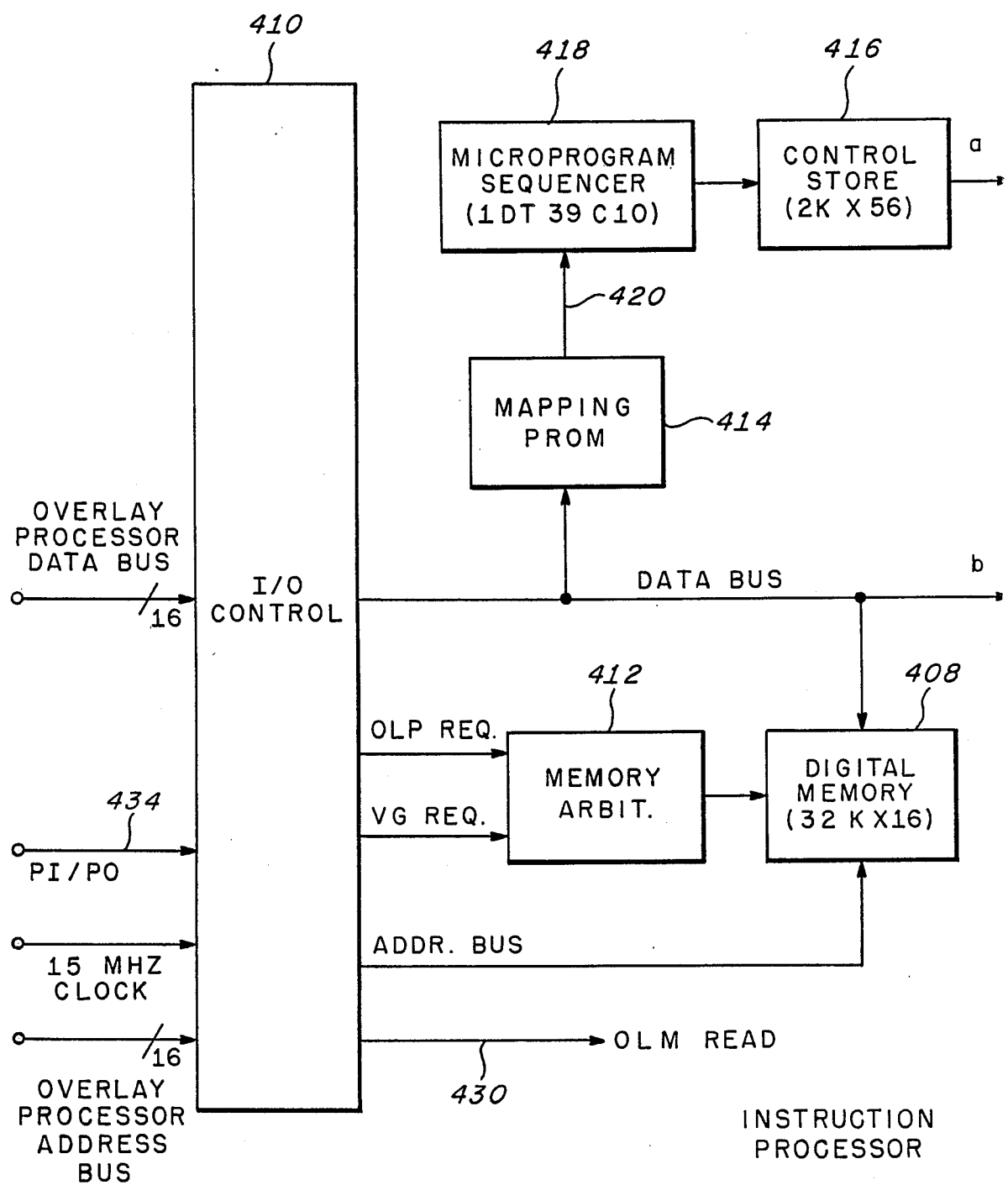
FIGS. 10a and 10b are a block diagram of the graphics generator.
Figure 10B:
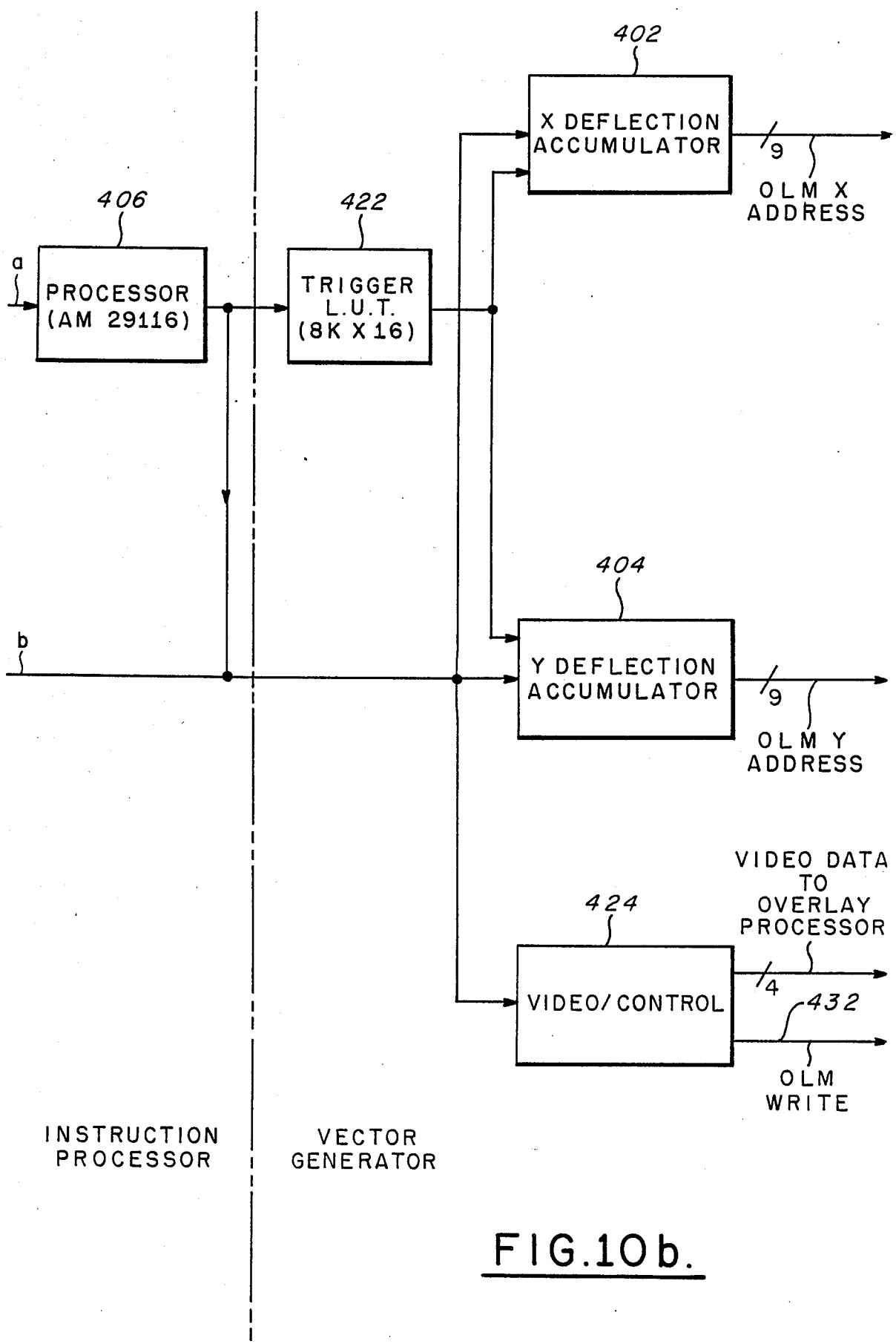

Referring to FIG. 10, a simplified functional block diagram of a graphics generator 42 is illustrated by which simultaneous display of graphical images in vector and raster form can be displayed along with map data. The graphics generator 42 includes an X deflection accumulator 402 and a Y deflection accumulator 404 which respond to deflection signals corresponding to deviations from the origin along the X and Y coordinate axes, respectively, for providing a substantially linear digital output representative of a desired graphical symbol to be superimposed on the display. A suitable deflection accumulator is shown in U.S. Pat. No. 4,481,605, Display Vector Generator utilizing Sine/Cosine Accumulation, filed Mar. 5, 1982, and assigned to the assignee of the present invention. The deflection accumulators 402 and 404 are controlled by the output of a microprocessor 406 so as to deliver signals corresponding to the various symbols and features to be displayed during flight. Data relating to the identification of the various symbols and characters are stored in a digital memory 408, which is loaded by I/O control 410. I/O control 410 receives data and address signals from the overlay processor 40, and a 15 MHZ clock signal from the master timer 46. A memory arbitrator 412 permits sequential access to the memory 408 by the I/O control 410 and the processor 406. A microprocessor 418 is coupled to mapping PROM 414 which comprises a look-up table of starting addresses in control store 416 for each of the microcode routines that execute a graphics command. These starting addresses are fed to the sequencer 418 in synchronism with the sequencer being commanded by the microcode to jump to the address at the sequencer input 420. Processor 406 is controlled by routines stored in control store 416, and the execution of the routines are controlled by the sequencer 418.

The outputs of processor 406 are in the form of primitive commands such as polar vector, tangent vector rectangular vector, and rotate. During the execution of tangent and polar vectors, incremented displacements of a displayed pixel are derived from a trigonometric look-up table 422. During slews and rectangular vectors, the data is derived from the processor 406. These values are coupled to the inputs of deflection accumulators 402 and 404.

The video control 424 is loaded with control data specifying the type of graphics operation to be performed with the corresponding data values loaded into deflection accumulators 402 and 404. Color values are determined by a look-up table within video control 424 to specify color and levels of intensity, or the video may be blanked on predetermined vectors.

In operation, the primary function of the graphics generator 42 is to generate the color raster symbology and terrain features that are to be superimposed on the map display. The type of symbology and its location on the map are loaded into the memory 408 by the overlay processor 40 on address bus 426 and data bus 428 via a fixed set of intermediate graphics instructions. These instructions are then processed to generate the overlay information in the overlay memory 44 using vector graphics techniques to generate points, lines, and characters.

The graphics generator 42 may be considered as comprised of two subsystems: an instruction processor and a vector generator. The basic graphic element produced by the vector generator is a straight line of pixels. This line may be translated, rotated, and concatenated. Vectors of various lengths and angles can be combined to produce the desired overlay symbology.

The graphics instructions are received by I/O control 410 from the overlay processor 40 and stored in digital memory 408. A font character definition code is downloaded into the memory and defines the alphanumeric characters and terrain features. Each font symbol is a graphics routine comprised of either polar vector or tangent vector commands. An operational program is also loaded into memory which controls the generation of the desired overlay symbology. This program is updated for each display frame. An additional memory area is reserved for command processing.

After a start signal is received initiating a new cycle of operation, video control 424 is loaded with a desired mode of operation. Processor 418 then writes primitive vector instructions into processor 406 for transferring data into the X and Y deflection accumulators. The accumulators then write the desired vector pattern into the overlay memory 44 in incremental X and Y data bits. A plurality of data words may be stored in the accumulators and video control for sequential execution. The color look-up table in video control 424 is programmed by the overlay processor 40.

The graphics generator uses a standard Cartesian coordinate system with horizontal X and vertical Y axes as the reference for positioning symbology on the map display. A graphics command is implemented that enables the specification of the coordinate origin anywhere within the image memory plane.

An overlay memory read strobe 430 is generated by I/O control 410 when data needs to be transferred from the overlay memory to the instruction processor. An overlay memory write strobe is generated by the video control 424 when data is to be transferred from the vector generator to the overlay memory.

The particular memory bank written to or read from is designated by PI/PO select line originating in the master timer 46.

The video generator provides the conversion of digital display data from the display memories and video synchronization signals from the master timer into RS-170A type analog signals.

Figure 11A:
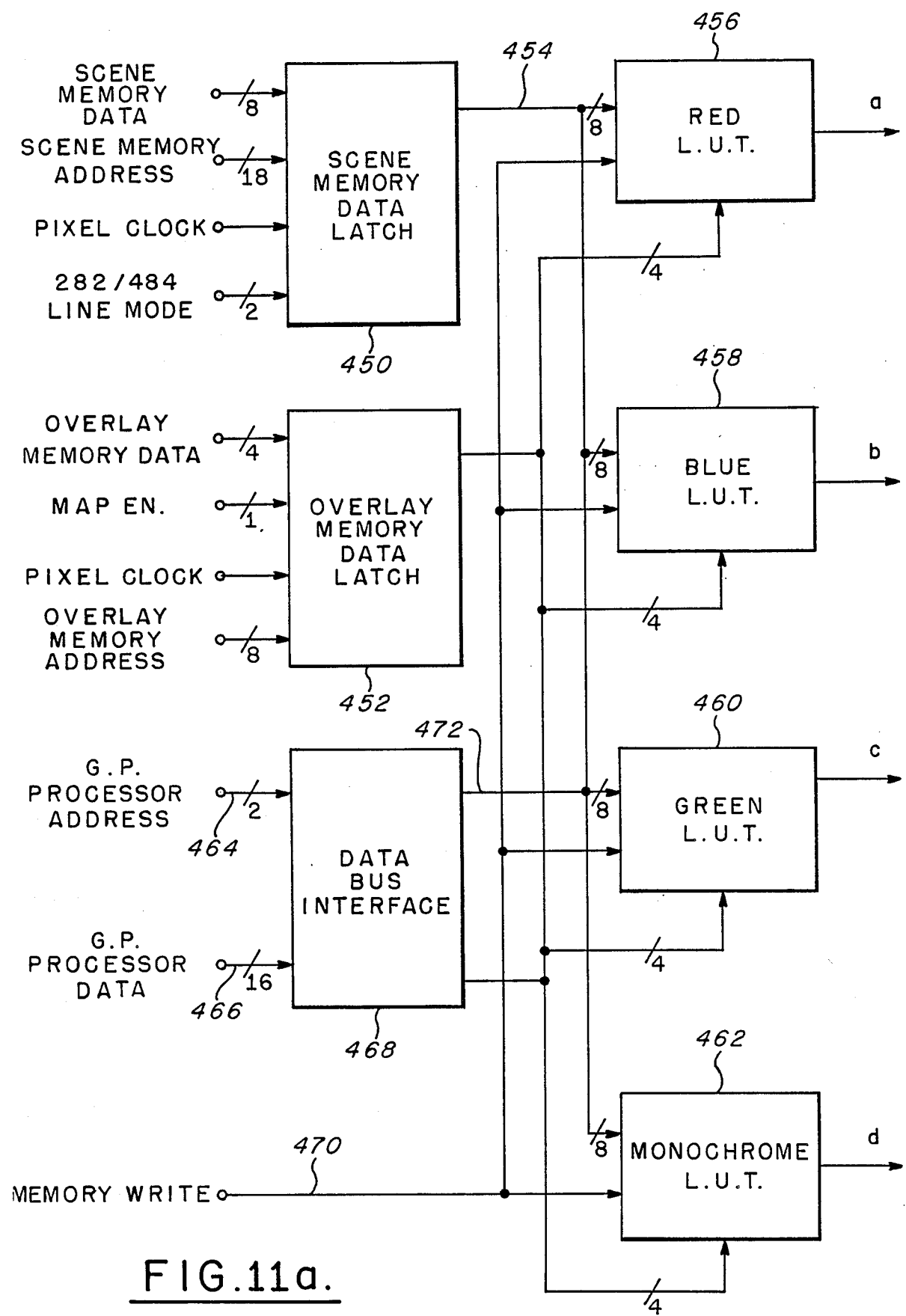
FIGS. 11a and 11b are a block diagram of the video generator.
Figure 11B:
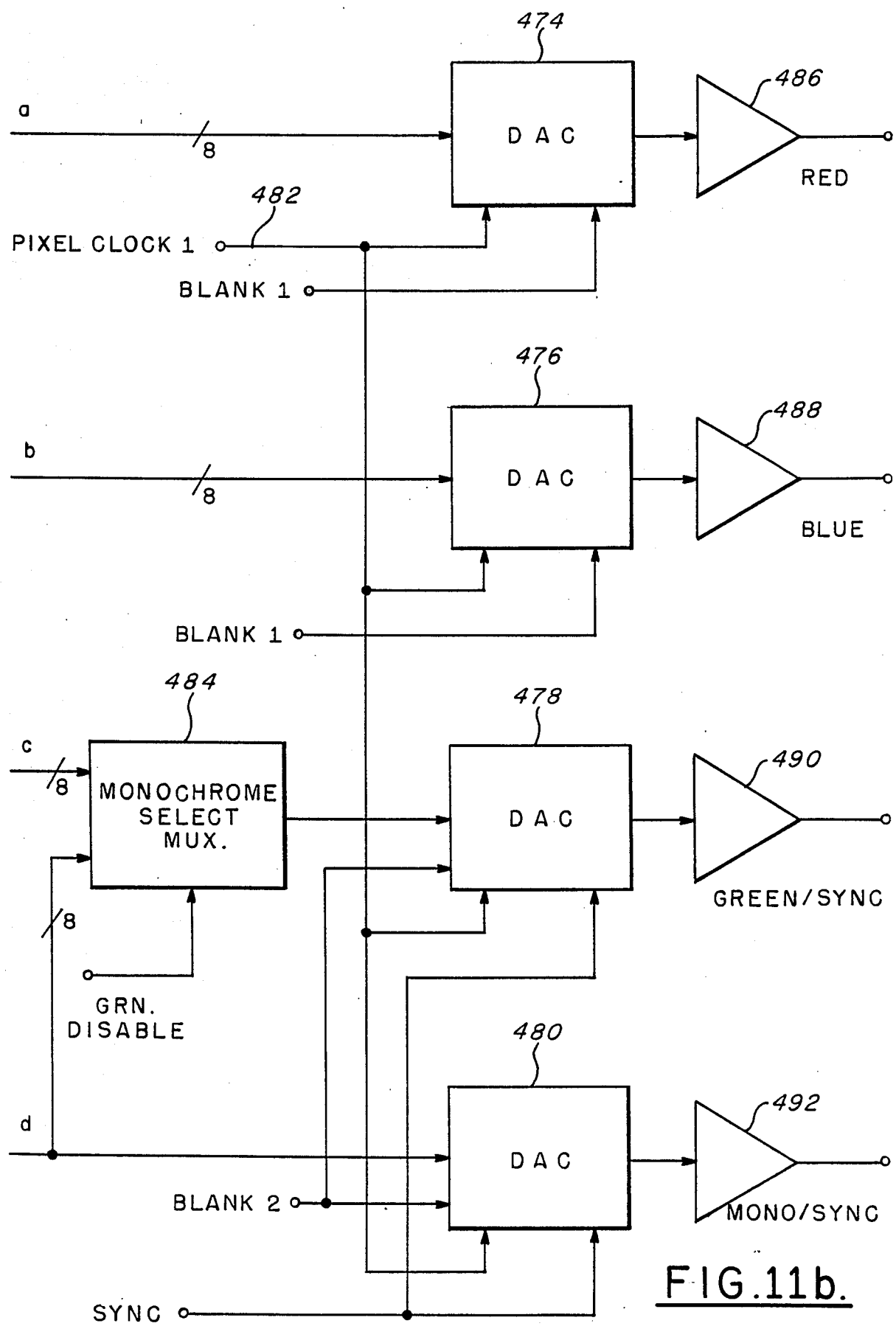

A block diagram of video generator 34 is shown in FIG. 11. Scene memory data (8 bits) and overlay memory data (4 bits) and the pixel clock are latched into latches 450 and 452, respectively. The pixel clock is at the predetermined pixel rate. The scene memory is operative in either 282 or 484 line modes. The 242 line mode is synchronized in such a way as to latch in data from the scene memory when the data from the overlay memory is latched at an even address, while both memories are read contiguously. In this manner, scene memory data is latched in every other address. All timing is digitally generated by the master timer 46. This includes pixel clock, horizontal sweep signals, and a composite sync signal.

The output of scene memory latch 450 is applied on an 8 bit bus 454 to color conversion PROM's 456, 458, 460, and 462. The PROM's are 8 bit color or monochrome look-up tables in which are encoded a predetermined range of color values and intensity, so as to provide the primary red, blue and green components or a monochrome output in digital format. The color and monochrome data conversion is implemented in 16k×8 RAM's and loaded by the processor 50 on power up through a 16 bit address line 464, 16 bit data line 466 and data bus interface 468. A memory write signal on bus 470 allows the RAM look-up tables to be loaded via bus 472. Each RAM is 8 bits wide, so that the processor loads two colors simultaneously. The red and blue are loaded at one time, as are the green and monochrome. This enables loading of the look-up tables to take place twice as fast as if each color were loaded separately. A map enable signal is fed through latch 452 to the look-up tables 456, 458, 460, and 462. This signal is used to allow data from the overlay memory to be displayed while inhibiting the display of data from the scene memory. The output from each of the red, blue, green and monochrome RAM's is fed on respective 8 bit buses to corresponding digital to analog convertors. The DAC's 474, 476, 478, and 480 convert the digital inputs to analog outputs. Pixel clock 1 is also applied to the DAC's on a bus 482.

When the monochrome mode is selected, DAC 474 and 476 are disabled by a blank 1 signal. The blank 1 signal is applied when the video is to be blanked for the red and blue outputs for vertical and horizontal sync, video disable, monochrome mode, and line video sweep. The blank 2 signal is applied only to DAC 470 and 480, but the monochrome mode has no impact on this signal. The red and blue DAC's use a different blanking signal than the green and monochrome DAC's due to the fact that red and blue must always be blanked while in the monochrome mode. The monochrome signal is applied to green DAC 478 through a MUX 484 coupled in series with green look-up table 460. A sync signal is applied only to the green and monochrome DAC's.

The analog color outputs are each fed to a buffer. The buffers 486, 488, 490, and 492 are coupled to corresponding inputs 36 of the CRT display 38.

CRT 38 may be comprised of a multicolor cathode ray table. Each buffer is connected to drive a red, green, or blue gun or to provide a monochrome signal.

Disk interface controller 20 serves as a mass data controller for loading map data signals and overlay data signals from mass memory unit 10 into the cache memory 24. It is comprised of a fiber optic interface 21 and a disk controller 20. The fiber optic interface 21 is comprised of optical to electrical conversion circuitry and electrical to optical conversion circuitry, a parallel to serial data convertor, and a controller. The disk interface controller 20 is comprised of a timing generator and disk read/write storage command memory, and converts the received serial signals to parallel form.

In operation, the disk controller 20 receives instructions from display stream manager 52 via the bus 51. These instructions initiate block data transfers to and from the digital memory unit 10. The instructions define the location of the required data on optical disk 12 and the number of data blocks needed. When the data transfer is complete, controller 20 signals display stream manager 52 and awaits further instructions. The timing generator controls the bus 22, which is a synchronous, time division multiplexed bus.

The fiber optic conversion circuits convert optical signals to TTL digital signals, and vice versa.

Master timer 46 provides a common timebase for the generation of all timing signals to produce the composite video signal. Master timer 46 generates clock signals at the pixel rate of 9.26 MHz. It also provides horizontal and vertical blanking, horizontal and vertical sync, and generates sequential addresses for the purpose of synchronizing the scanning of information stored in the scene and overlay memories for developing pixel data. Horizontal and vertical sweep signals are generated to define the active window of line video display.

Timer 46 supports two display modes: 525 lines at 60 Hz rate and 625 lines at 50 Hz rate, both supporting 2:1 interface. Preferably, there are 484 displayable pixels per line, but scene memory data may also be read out at a rate of 242 pixels per line while being displayed at 484 pixels per line by reading each pixel twice.

Horizontal and vertical blanking and synchronization pulses are generated in accordance with EIA RS-170A Standard, which is well known in the art and is hereby incorporated by reference. Preferably, all signals are generated from a common timebase to maintain absolute relative relationships.

Referring now to FIG. 12, wherein the timing waveforms shown are not drawn to scale in order to more clearly show the structure, in operation a train of pixel pulses 502 is generated at 9.26 MHz, which results in a pulse duration of 108 ms. A horizontal scan signal establishes the rate between successive lines of the display, and is typically of the order of 15,750 Hz for a 525 line display. This results in a time interval 504 between the end of one raster line and the end of the next, including retrace of 63.5 us.

The two memories are addressed in a synchronism with the pixel clock pulses, as shown at waveform 506. The horizontal scan is blanked during retrace by a blanking pulse 508. A horizontal sync pulse 512 is generated during the blanking interval for synchronizing the horizontal scanning circuits in a conventional manner. The horizontal line video signals are a variable, depending on the width of the window to be displayed, hence are not shown. The vertical signals are generated in a similar manner at a 60 Hz or 50 Hz frame rate.

FIG. 13 shows corresponding vertical blanking and sync signals for a 20 Hz frame rate for loading and reading the scene and overlay memories wherein each frame is 50 ms in duration. Each field is 16.67 ms in duration, and three fields are generated for each frame. The ping-pong select signal PI/PO alternates between a logic high and logic low for each successive frame. When PI is high, the timer addresses and writes pixel data into the PI memories, and reads out data previously stored in the PO memories. When PO is low, the timer reads out the data stored in PI memories, and overwrites new pixel data into the PO memories.

While the invention has been described in its preferred embodiments it is to be understood that the words which have been used are words of description rather than limitation and that changes may be made within the perview of the appended claims without departing from the true scope and spirit of the invention in its broadest aspects.

Embodiments of an invention in which an exclusive property or right is claimed are defined as follows:

1. Digital mapping display system for an aircraft, wherein said aircraft includes a mission computer for generating digital signals indicative of the aircraft's present longitude and latitude coordinate positions, a heading signal indicative of the angular direction of motion, and signals corresponding to map data and graphical data, further including a mass memory unit for storing said map data signals in digital form representative of a map of territory overflown by the aircraft and for providing map data signals corresponding thereto, and for storing overlay data in digital form representative of graphical information to be superimposed on said map data, and for providing overlay data signals corresponding thereto, said display system comprising:

mass data controller means for extracting said map data signals or said overlay data signals from said mass memory unit and periodically providing updated images, cache memory means coupled to said mass data controller means for electronically storing digital data indicative of a portion of a complete map of territory overflown by and surrounding said aircraft, said cache memory means comprised of an array of storage segments, the number of said storage segments being substantially less than the number of segments necessary to store an image representative of a complete map of territory and greater than that necessary to store an image of said portion of a complete map for any orientation of said aircraft, each such segment being randomly positionally programmable along predetermined X and Y coordinates corresponding to latitude and longitude of said complete map of territory, and responsive to means for dynamically relocating said positions in a predetermined physical address space with respect to changes in said aircraft's coordinate position and orientation, said storage segments configured in a logical Cartesian coordinate array corresponding to said portion of said complete map of territory, each of said segments comprised of a plurality of storage elements wherein each of said storage elements stores at least one bit of digital map data and wherein each storage location has a corresponding address, and further comprising segment mapping means responsive to an address command for storing an address representative of the location of each segment within said physical address space and the location of each storage element within each segment, first control processor means responsive to said signals generated by said mission computer and for transmitting status signals to said mission computer, and further providing display mode commands and mass memory control data, second control processor means responsive to said first control processor means for retrieving said map and data overlay signals from said mass memory unit in accordance with said aircraft's coordinate position, for providing control signals for periodically storing said updated images derived from said mass memory unit into said cache memory means, and for controlling data display, address generator means responsive to control signals from said second control processor means for reading and extracting map data or overlay data from said cache memory means, and transferring said data in the form of displayable pixels to first or second memory means, video generator means, responsive to digital outputs of said first and second memory means, for converting said map data pixel signal and said overlay data pixel signal to signals displayable in color or monochrome form, and display means coupled to said video generator means and responsive to said map data and overlay data pixel signals and to a source of timing signals for providing a displayable image at a predetermined frame rate, said image corresponding to at least said portion of said complete map of territory.

2. The apparatus as set forth in claim 2, said cache memory means further comprising means for storing graphical images for overlaying said portions wherein ones of said storage elements store at least one bit of overlay data.

3. A digital mapping display system as set forth in claim 2, wherein said cache memory means further comprises: an n×m array of buffer segments, each buffer segment being independently programmable with respect to its logical position within said physical X, Y coordinate space to form a predetermined virtual image plane, wherein each said buffer segment is addressable by its physical position in accordance with an $x_i$, $y_j$ coordinate position and by a logical position within a virtual image plane.

4. A digital mapping display system as set forth in claim 3, wherein said segment mapping means comprises an associated mapping register programmable by said second control processor means and having a two-dimensional address for defining where an associated buffer segment is located within said physical address space and to which address said segment will respond, whereby ones of said segments may be mapped anywhere within said physical address space by programming said associated register.

5. A digital mapping display system as set forth in claim 4, wherein said digital data is transferred to said buffer segments at least one segment at a time and a segment of data bits to update said first or second memory means is sequentially scanned over a plurality of said segments logically organized contiguously in accordance with said physical address space, but not necessarily contiguously within said n×m array.

6. A digital mapping display system as set forth in claim 5, wherein said digital data is transferred from said mass memory unit to said buffer segments for updating said cache memory means and a predetermined plurality of said buffer segments are configured in a single memory plane.

7. A digital mapping display system as set forth in claim 6 wherein said plurality of buffer segments are configured in a plurality of parallel image planes having corresponding storage elements in each plane and wherein said corresponding storage elements in each plane have the same address for collectively storing a digital word representative of color and intensity of a displayed pixel, and wherein said video generator means further comprises decoder means responsive to said digital word when stored in said first or second memory means and to said pixel clock and line video timing signals for generating analog pixel signals in accordance therewith.

8. A digital map system as set forth in claim 7, further comprising video processor means, comprising:
linear feature generator means responsive to address and data signals from said overlay processor means representative of displayable locations in said second memory means for selectively providing linear feature signals of predetermined color value, sun angle shading generator means, responsive to control and data signals from said cache memory means for selecting a predetermined reflectivity map and providing a predetermined value of color intensity at a given elevation corresponding to predetermined values of sun azimuth, sun zenith and aircraft heading, color band storage means responsive to terrain elevation values and to displayable locations for providing color hues defining bands of a predetermined color at a given range of elevations, and further responsive to aircraft altitude for providing further color hues representative of differences in elevation of the terrain and the aircraft altitude, means for combining said hues in said color bands or said further hues with values of color intensity at a corresponding elevation and displayable location to derive modified color values in primary color format, means responsive to said modified color values and to elevation differences of an integer $x_i$, $y_j$ location and a non-integer x, y location at said displayable location for deriving a color composite in primary color value form, means responsive to said elevation differences for deriving an average value thereof, means for comparing said average elevation value with a table of predetermined elevation values, and means for providing a resultant color value output corresponding to a predetermined elevation when at least one pair of said compared values coincide, said output corresponding to a change in elevation value, and means for selectively applying said color composite and said resultant color value to derive a limited range of color values corresponding to neighboring elevations and for applying the selected color value to said second memory means.

9. A digital map system as set forth in claim 8 wherein said video processor means further comprises means responsive to control signals from said first control processor means for displaying a contour line corresponding to said resultant color value at a plurality of neighboring locations at a predetermined elevation and for blanking a signal corresponding to said color composite when said non-integer x, y coordinate location coincides with said predetermined elevation, and for blanking said contour line and displaying said color composite when said non-integer location and said given elevation value do not coincide.

10. A digital map system as set forth in claim 9 wherein said linear feature generator means further comprises:

code book means for storing linear feature data in digital form, said code book means comprised of a plurality of addressable storage locations wherein each of said storage locations stores one bit of digital data, and coupled to said overlay processor means for receiving linear feature data therefrom for storage within, wherein said stored data is responsive to updating of said cache memory means by said mass memory data controller means, said stored data representative of a plurality of selectable linear features and responsive to command signals from said overlay processor means for selecting predetermined ones of said linear features, first switch means responsive to command signals from said cache memory means for selecting ones of said predetermined linear features in accordance with corresponding ones of said storage segments of said cache memory means, and further responsive to command signals for selecting predetermined groups of said predetermined linear features, second switch means responsive to said command signals from said first control processor means for selectively enabling or disabling ones of said linear features, and linear feature storage means coupled to receive said selected linear features and color command signals from said first control processor means for providing a linear feature color output signal to said first memory means.

11. A digital map system as set forth in claim 10 wherein said address generator means further comprises:

decoder means responsive to address signals from said second control processor means for selectively providing initialization commands, x read address generator means, responsive to command signals from said decoder means, data signals from said second control processor means, and to a source of sequential control signals for providing an read address signal corresponding to a plurality of sequential x coordinate pixel locations, y read address generator means, responsive to said command signals from said decoder means and to said data signals from said second control processor means for providing a y read address signal corresponding to a plurality of sequential y coordinate pixel locations, means for reading said x, y read address signals into said cache memory means and deriving pixel signals therefrom representative of said map data or overlay data, means responsive to said command, control, and data signals for generating an x write address corresponding to said x read address, means responsive to said command, control, and data signals for generating a y write address corresponding to said y read address, line counter means for generating sequential status signals corresponding to completion of an x count representative of a predetermined number of pixels in the x-coordinate direction and completion of a y count corresponding to a predetermined number of pixels in the y-coordinate direction, the completion of said x and y counts corresponding to a frame of data, and state sequencer means for generating said x and y read and write control signals and for providing further control signals to said cache memory means, said overlay processor means, said video processor means, and said first memory means.

12. A digital map system as set forth in claim 11, further comprising graphics generator mean coupled to receive overlay data in vector form from said overlay processor means and to provide feature symbology and $x_i$, $y_j$ coordinate addresses corresponding thereto to said second memory means.

13. A digital map system as set forth in claim 12, wherein said graphics generator means further comprises:

I/O control means responsive to digital signals from said overlay processor means, said digital signals representative of a desired graphical symbol to be presented on said display means, digital memory means coupled to said I/O control means for storing graphical images in digital form corresponding to a plurality of displayable symbols, processor means responsive to said digital memory means for converting said stored images to a plurality of vector instructions, geometric conversion means coupled to receive said vector instructions for translating said vector instructions into incremental displacement commands representative of incremental steps along said X and Y coordinate axes and of a predetermined length, X accumulator means for providing a digital output corresponding to a sum of said incremental steps along said X coordinate axis so as to incrementally change said digital output to provide a substantially linear X deflection signal, Y accumulator means for providing a further digital output corresponding to a sum of said incremental steps along said Y coordinate axis so as to incrementally change said further digital output to provide a substantially linear Y deflection signal, and video control means responsive to said I/O control means for controlling the displayed color of pixels corresponding to said X and Y deflection signals.

14. The graphics generator means as set forth in claim 13, wherein one of said incremental displacement commands is representative of a polar vector.

15. The graphics generator means as set forth in claim 14, wherein one of said incremental displacement commands is representative of a tangent vector.

16. The graphics generator means as set forth in claim 15, wherein one of said incremental displacement commands is representative of a rectangular vector.

17. The graphics generator means as set forth in claim 16, further comprising means for rotating said polar vector or said rectangular vector by a predetermined angular displacement.

18. The graphics generator means as set forth in claim 17, further comprising means for controlling the number of said incremental steps in accordance with said angular displacement and a vector length signal.

19. The graphics generator as set forth in claim 18, wherein said digital memory means is sequentially responsive to said I/O control means for writing images in digital form therein and to said processor means for reading out said images.

20. A digital map system as set forth in claim 19, said first memory means comprising:

first and second alternately sequenced memory banks for storing first and second frames of image signals respectively, and switching means, responsive to digital signals synchronous with said timing generator means for alternately:

(A) controlling said first sequenced memory bank for writing updated image signals into said first sequenced memory bank with respect to said first frame of image signals while controlling said second sequenced memory bank for reading out said second frame to said display system and (B) controlling said second sequenced memory bank for writing updated image signals into said second sequenced memory bank with respect to said second frame while controlling said first sequenced memory bank for reading out said updated image.

21. A digital map system as set forth in claim 20 said first memory means further comprising:

control register means responsive to signals from said first control processor means, said source of timing signals, said address generator means and said video processor means, for generating a memory address command and a data write command and for providing video processor data signals for writing into said first and second alternately sequenced memory banks, said switching means further comprising:

(A) first multiplexer means selectively responsive to a first signal from said address generator means corresponding to an address in said cache memory means and to a second signal from said source of timing signals corresponding to an address in said video generator means and coupled to said control register means for providing one of said first or second address signals to said first alternately sequenced memory bank, (B) second multiplexer means selectively responsive to a third signal corresponding to a further address in said cache memory means from said address generator means and a fourth signal from said source of timing signals corresponding to a further address in said video generator means coupled to said control register means for providing one of said third or fourth address signals to said second alternately sequenced memory bank, and (C) third multiplexer means for receiving data stored in said first and second alternately sequenced memory banks in response to a control signal from said control register means and providing a data signal corresponding to a selected one of said sequenced memory banks to said video generator means in response to a control signal from said control register means, wherein said control register means is operative to read in a first memory address command from said address generator means and store video processor data in a first one of said alternately sequenced memory banks while reading in a first memory address command from said source of timing signals to a second one of said alternately sequenced memory banks and reading out data stored therein to said video generator means and then reading in a second sequential memory address command from said source of timing signals to said first one of said alternately sequenced memory banks and reading out the data previously stored therein to said video generator means while reading in a second sequential memory address command from said address generator means and storing video processor data corresponding thereto into said second one of said alternately sequenced memory banks, so that said first and second alternately sequenced memory banks are caused to read in data and write out data in ping-pong fashion, one of said alternately sequenced memory banks being loaded with new video processor data while the other of said alternately said sequenced memory banks reads out its data into said video generator means.

22. A digital mapping display system as set forth in claim 21, said first memory means further comprising means for alternately and sequentially storing map data in said first bank while map data stored in said second bank is read out for said display, and for storing updated map data in said second bank while map data stored in said first bank is read out, said reading and writing operations responsive to control signals from said first control processor means and to said switching means for providing a pixel signal output corresponding to said map data, said second memory means further comprising third and fourth memory banks for alternately and sequentially storing overlay data in said third bank thereof while overlay data in said fourth bank thereof is read out for said display, and for storing updated overlay data in said fourth bank while overlay data stored in said third bank thereof is read out, said reading and writing operations responsive to further control signals from said first control processor means and to said switching means, for providing a pixel signal corresponding to said overlay data.

23. A digital map system as set forth in claim 22 wherein said video generator means further comprises:
means for converting a map data pixel signal to a first primary color signal in analog form and
means for converting an overlay data pixel signal to a second primary color signal in analog form.

24. A digital map system as set forth in claim 23, wherein said video generator means further comprises:
means for converting said map data pixel signal or said overlay data pixel signal to a monochrome signal in analog form, and
means for selectively outputting said first or second primary color signals or said monochrome signal.

25. A digital map system as set forth in claim 24, said video generator means further comprising:
first lookup table storage means for receiving at least a four bit digital word and providing an eight bit color word in digital form corresponding to a predetermined primary color value.

26. A digital map system as set forth in claim 25, said video generator means further comprising
second lookup table storage means for receiving at least a four bit digital word and providing an eight bit word in digital form corresponding to a predetermined monochrome value.

27. A digital map system as set forth in claim 26, said video generator means further comprising means responsive to said first control processor means for loading color values into at least two of said look-up table storage means simultaneously.

28. A digital map system as set forth in claim 26, wherein said video generator means further comprises means for providing an analog video signal in RS-170A format.

29. A digital map system as set forth in claim 27, said video generator means further comprising means for providing a composite sync signal and combining said composite sync signal with a predetermined one of said signals in analog form.

30. A digital map system as set forth in claim 1, said mass data controller means further comprising:
fiber optic interface means coupled to said mass memory unit for receiving optical signals in digital form and converting said optical signals to electrical signals in serial form, and
disk controller means responsive to said serial electrical signals, for converting said signals to parallel form and providing said converted signals to said cache memory means,
said disk controller means further responsive to said second control processor means for initiating a block transfer of data from said memory unit controller means to said cache memory means.

31. A digital mapping display system as set forth in claim 30 said source of timing signals comprising:
timing generator means responsive to control signals from said first control processor means for providing $x_i$, $y_j$ addresses to said first and second memory means for reading said pixel signals in sequential order corresponding to a predetermined frame rate and video resolution, and for providing horizontal and vertical synchronizing signals, horizontal and vertical blanking signals, pixel clock and line video timing signals.

32. A digital mapping system as set forth in claim 31, wherein said timing generator means has a scan pattern comprising:
two interlaced fields of map or overlay data,
means for generating sequential addresses along every other parallel line beginning with said first starting addresses to generate said first field of data and to generate sequential addresses along the parallel lines between said very other parallel line beginning with said second starting addresses to generate said second field of data interlaced with said first field of data,
means synchronous with said vertical synchronization signal for generating a ping-pong memory select signal for alternately and sequentially selecting one of said first or second memory banks and one of said third or fourth memory bans, for reading one of said first or second memory bans and writing into one other than said one of said first or second memory banks, and reading one of said third or forth memory banks and writing into one other than said one of said third or fourth memory bans.

33. A digital mapping system as set forth in claim 32, wherein said means for generating a ping-pong select signal is synchronous with a predetermined video frame rate, and said video frame rate is comprised of three fields comprised of sequentially addressing said first and second fields of data.

34. A digital map system as set forth in claim 33, said cache memory means further comprising:
a plurality of address selector switch means responsive to signals from said address generator means, said second control processor means, and said mass data controller means, for selectively addressing one of a plurality of said storage segments,
first buffer means, responsive to map data signals from said plurality of storage segments, for selectively providing an output from one of said storage segments to said video processor means,
second buffer means responsive to overlay data signals from said plurality of storage segments for selectively providing an output from one of said storage segments to said overlay processor means, and
third buffer means, responsive to decoded data signals from said mass data controller means for selectively providing map and overlay data to be stored in said plurality of storage segments of said cache memory means, and
segment controller means comprising means coupled to receive address signals from said address generator means and address and data signals from said second control processor means, and means for selectively enabling said first, second, or third buffer means for loading data from a first data bus coupled to said mass data controller means into said storage segments and for loading stored data into a second data bus coupled to said video processor means, so that ones of said storage segments can be loaded with map or overlay data while still further ones of said storage segments can be simultaneously read into said first or second scene memories, whereby said scene memories can be loaded without contemporaneous access of said mass memory unit.

35. A digital map display system as set forth in claim 34 further comprising a display list register for storing an address wherein associated overlay data is stored in at least one of said parallel planes.

36. A method for generating a digital mapping display system for an aircraft, wherein said aircraft includes a mission computer for generating digital signals indicative of the aircraft's present longitude and latitude coordinate positions, a heading signal indicative of the angular direction of motion, and signals corresponding to map data and graphical data, further including a mass memory for storing said map data signals in digital form representative of a map of territory overflown by the aircraft and for providing map data signals corresponding thereto, and for storing overlay data in digital form representative of graphical information to be superimposed on said map data, and for providing overlay data signals corresponding thereto, said display system comprising the steps of:

extracting said map data signals or said overlay data signals from said mass memory unit and periodically providing updated images, storing digital images indicative of a portion of a complete map of territory overflown by and surrounding said aircraft in a cache memory means, said cache memory means comprised of an array of storage segments, the number of said storage segments being substantially less than the number of segments necessary to store an image representative of a complete map of territory and greater than that necessary to store an image of said portion of a complete map for any orientation of said aircraft, each such segment being randomly positionally programmable along predetermined X and Y coordinates corresponding to latitude and longitude of said complete map of territory; dynamically relocating said positions in a predetermined physical address space with respect to changes in said aircraft's coordinate position and orientation; configuring said storage segments in a logical Cartesian coordinate array corresponding to said portion of said complete map of territory, each of said segments comprised of a plurality of storage elements wherein each of said storage elements stores at least one bit of digital map data and wherein each storage location has a corresponding address; and said segment means in mapping response to an address command for storing an address representative of the location of each segment within said physical address space and the location of each storage element within each segment, transmitting status signals to said mission computer, and further providing display mode commands and mass memory control data, in response to signals generated by said mission computer, retrieving said map and data overlay signals from said mass memory unit in accordance with said aircraft's coordinate position, for providing control signals for periodically storing said updated images derived from said mass memory unit into said cache memory means, and for controlling data display, generating address signals for reading and extracting map data or overlay data from said cache memory means, and transferring said data in the form of displayable pixels to first or second memory means, generating video signals by converting said map data pixel signals and said overlay data pixel signals to signals displayable in color or monochrome form, and applying said converted map data and overlay data pixel signals and a source of timing signals to a display for providing a displayable image at a predetermined frame rate, said image corresponding to at least said portion of said complete map of territory.

37. The method as set forth in claim 36, said step of storing digital images further comprising storing graphical images for overlaying said portions wherein ones of said storage elements store at least one bit of overlay data.

38. The method as set forth in claim 37, wherein said cache memory means further comprises an n×m array of buffer segments, each buffer segment being independently programmable with respect to its logical position within said physical X, Y coordinate space to form a predetermined logical image plane, and wherein the step of storing an address in each said segment includes a physical position in accordance with an $x_i$, $y_j$ coordinate position and a logical position within a virtual image plane.

39. The method as set forth in claim 38, wherein said segment mapping means comprises an associated mapping register programmable by said second control processor means and having a two-dimensional address for defining where an associated buffer segment is located within said physical address space and to which address said segment will respond, wherein the step of mapping said segments provides for mapping anywhere within said physical address space by programming said associated register.

40. The method as set forth in claim 39, further including the step of transferring digital data to said buffer segments at least one segment at a time and a sequentially scanning a segment of data bits to update said first or second memory means over a plurality of said segments logically organized contiguously in accordance with said physical address space, but not necessarily contiguously within said n×m array.

41. The method as set forth in claim 40, further including the step of transferring said digital data from said mass memory unit to said buffer segments for updating said cache memory means and configuring a predetermined plurality of said buffer segments in a single memory plane.

42. The method as set forth in claim 41 further including the steps of configuring said plurality of buffer segments in a plurality of parallel image planes having corresponding storage elements in each plane and collectively storing a digital word representative of color and intensity of a displayed pixel in corresponding storage elements in each plane having the same address, and further generating analog pixel signals by said video generator means in response to said digital word when stored in said first or second memory means and to said pixel clock and line video timing signals applied to decoder means.

43. The method as set forth in claim 42, including the steps of:
  selectively providing linear feature signals of predetermined color value by applying, address and data signals from said overlay processor means representative of displayable locations in said second memory means to linear feature generation means,
  applying control and data signals from said cache memory means to sun angle shading generator means for selecting a predetermined reflectivity map and providing a predetermined value of color intensity at a given elevation corresponding to predetermined values of sun azimuth, sun zenith and aircraft heading,
  applying terrain elevation values and displayable locations for providing color hues defining bands of a predetermined color at a given range of elevations, to color band generator means and further applying an aircraft altitude signal for providing further color hues representative of differences in elevation of the terrain and the aircraft altitude,
  combining said hues in said color bands or said further hues with values of color intensity at a corresponding elevation and displayable location to derive modified color values in primary color format,
  applying said modified color values and elevation differences of an integer $x_i$, $y_j$ location and a non-integer x, y location at said displayable location to derive a color composite in primary color value form,
  applying said elevation differences to derive an average value thereof, comparing said average elevation value with a table of predetermined elevation values, and providing a resultant color value output corresponding to a predetermined elevation when at least one pair of said compared values coincide, said output corresponding to a change in elevation value, and
  selectively applying said color composite and said resultant color value to derive a limited range of color values corresponding to neighboring elevations and applying the selected color value to said second memory means.

44. The method as set forth in claim 43 for further comprising the steps of displaying a contour line corresponding to said resultant color value at a plurality of neighboring locations at a predetermined elevation, blanking a signal corresponding to said color composite when said non-integer x, y coordinate location coincides with said predetermined elevation, and blanking said contour line and displaying said color composite when said non-integer location and said given elevation value do not coincide.

45. A digital map system as set forth in claim 44 further including the step of storing linear feature data in a code book in digital form in a third memory, said code book comprised of a plurality of addressable storage locations wherein each of said storage locations stores one bit of digital data, and applying linear feature data for storage within said third memory, wherein said stored data is responsive to updating of said cache memory means by said mass memory data controller means, said stored data representative of a plurality of selectable linear features and responsive to command signals from said overlay processor means for selecting predetermined ones of said linear features,
  applying command signals from said cache memory means to first switch means for selecting ones of said predetermined linear features in accordance with corresponding ones of said storage segments of said cache memory means, and applying command signals for selecting predetermined groups of said predetermined linear features,
  applying command signals to second switch means for selectively enabling or disabling ones of said linear features, and
  applying selected linear features and color command signals to a fourth memmory for providing a linear feature color output signal to said first memory means.

46. The method as set forth in claim 45 further comprising the steps of applying address signals for selectively providing initialization commands to address generator decoder means,
  applying command signals from said decoder means, data signals, and a source of sequential control signals to x read address generator means for providing an x read address signal corresponding to a plurality of sequential x coordinate pixel locations,
  applying command signals from said decoder means and data signals to y read address generator means for providing a y read address signal corresponding to a plurality of sequential y coordinate pixel locations,
  reading said x, y read address signals into said cache memory means and deriving pixel signals therefrom representative of said map data or overlay data,
  generating an x write address in response to said command, control, and data signals corresponding to said x read address,
  generating a y write address in response to said command, control, and data signals corresponding to said y read address,
  applying a line counter for generating sequential status signals corresponding to completion of an x count representative of a predetermined number of pixels in the x-coordinate direction and completion, of a y count corresponding to a predetermined number of pixels in the y-coordinate direction, the completion of said x and y counts corresponding to a frame of data, and
  generating said x and y read and write control signals and providing further control signals to said cache memory means, said overlay processor means, said video processor means, and said first memory means.

47. The method as set forth in claim 46, further comprising the steps of applying overlay data in vector form and providing feature symbology and $x_i$, $y_j$ coordinate addresses corresponding thereto to said second memory means from graphics generator means.

48. The method as set forth in claim 47, wherein the steps of applying overlay data, feature symbology, and coordinate addresses to said graphics generator means further comprises:
  applying digital signals to I/O control means, said digital signals representative of a desired graphical symbol to be presented on said display means,
  storing graphical images in digital form corresponding to a plurality of displayable symbols in digital memory means, converting said stored images to a plurality of vector instructions, translating said vector instructions into incremental displacement commands representative of incremental steps along said X and Y coordinate axes and of a predetermined length, providing a digital output corresponding to a sum of said incremental steps along said X coordinate axis so as to incrementally change said digital output to provide a substantially linear X deflection signal, providing a further digital output corresponding to a sum of said incremental steps along said Y coordinate axis so as to incrementally change said further digital output to provide a substantially linear Y deflection signal, and controlling the displayed color of pixels corresponding to said X and Y deflection signals.

49. The method as set forth in claim 48, wherein the step of providing one of said incremental displacement commands is representative of providing a polar vector.

50. The method as set forth in claim 49, wherein the step of providing one of said incremental displacement commands is representative of providing a tangent vector.

51. The method as set forth in claim 50, wherein the step of providing one of said incremental displacement commands is representative of providing a rectangular vector.

52. The method as set forth in claim 51, further comprising the step of rotating said polar vector or said rectangular vector by a predetermined angular displacement.

53. The method as set forth in claim 52, further comprising the step of controlling the number of said incremental steps in accordance with said angular displacement and a vector length signal.

54. The method as set forth in claim 53, further comprising the steps of sequentially writing images in digital form into said digital memory means for reading out said images.

55. The method as set forth in claim 54, further comprising:

storing first and second frames of image signals respectively, in first and second alternately sequenced memory banks of said first memory means, and switching digital signals synchronous with said timing generator means for alternately:

(A) controlling said first sequenced memory bank for writing updated image signals into said first sequenced memory bank with respect to said first frame of image signals while controlling said second sequenced memory bank for reading out said second frame to said display system and (B) controlling said second sequenced memory bank for writing updated image signals into said second sequenced memory bank with respect to said second frame while controlling said first sequenced memory bank for reading out said updated image.

56. The method as set forth in claim 55 further comprising:

the steps of generating a memory address command and a data write command and providing video processor data signals for writing into said first and second alternately sequenced memory banks, (A) selectively applying a first signal from said address generator means corresponding to an address in said cache memory means and a second signal from said source of timing signals corresponding to an address in said video generator means and coupled to said control register means for providing one of said first or second address signals to said first alternately sequenced memory bank, (B) selectively applying further address in said cache memory means from said address generator means and a fourth signal from said source of timing signals corresponding to a further address in said video generator means coupled to said control register means for providing one of said third or fourth address signals to said second alternately sequenced memory bank, and (C) applying data stored in said first and second alternately sequenced memory banks in response to a control signal from said control register means and providing a data signal corresponding to a selected one of said sequenced memory banks to said video generator means in response to a control signal from said control register means, wherein said control register means is operative to read in a first memory address command from said address generator means and store video processor data in a first one of said alternately sequenced memory banks while reading in a first memory address command from said source of timing signals to a second one of said alternately sequenced memory banks and reading out data stored therein to said video generator means and then reading in a second sequential memory address command from said source of timing signals to said first one of said alternately sequenced memory banks and reading out the data previously stored therein to said video generator means while reading in a second sequential memory address command from said address generator means and storing video processor data corresponding thereto into said second one of said alternately sequenced memory banks, so that said first and second alternately sequenced memory banks are caused to read in data and write out data in ping-pong fashion, one of said alternately sequenced memory banks being loaded with new video processor data while the other of said alternately said sequenced memory banks reads out its data into said video generator means.

57. The method as set forth in claim 56, further comprising the steps of alternately and sequentially storing map data in said first bank while map data stored in said second bank is read out for said display, and storing updated map data in said second bank while map data stored in said first bank is read out, and providing a pixel signal output corresponding to said map data, and alternately and sequentially storing overlay data in second memory means having a said third bank while overlay data in a fourth bank thereof is read out for said display, and storing updated overlay data in said fourth bank while overlay data stored in said third bank thereof is read out, and switching means for providing a pixel signal corresponding to said overlay data.

58. The method as set forth in claim 57 further comprising the steps of generating video data by:

converting a map data pixel signal to a first primary color signal in analog form and converting an overlay data pixel signal to a second primary color signal in analog form.

59. The method as set forth in claim 58, further comprising the steps of generating video data by:
converting said map data pixel signal or said overlay data pixel signal to a monochrome signal in analog form, and
selectively outputting said first or second primary color signals or said monochrome signal.

60. The method as set forth in claim 59, further comprising the steps of generating video data by:
providing a first lookup table storage means for receiving at least a four bit digital word and providing an eight bit color word in digital form corresponding to a predetermined primary color value.

61. The method as set forth in claim 60, further comprising the steps of generating video data by:
providing a second lookup table storage means for receiving at least a four bit digital word and providing an eight bit word in digital form corresponding to a predetermined monochrome value.

62. The method as set forth in claim 61, further comprising the step of loading color values into at least two of said look-up table storage means simultaneously.

63. The method as set forth in claim 62, further comprising the step of providing a composite sync signal and combining said composite sync signal with a predetermined one of said signals in analog form.

64. The method as set forth in claim 63, further comprising the step of:
receiving optical signals in digital form and converting said optical signals to electrical signals in serial form,
converting said signals to parallel form and providing said converted signals to said cache memory means, and
initiating a block transfer of data from said memory unit controller means to said cache memory means.

65. The method as set forth in claim 64 further comprising the steps of: providing $x_i$, $y_j$ addresses to said first and second memory means for reading said pixel signals in sequential order corresponding to a predetermined frame rate and video resolution, and providing horizontal and vertical synchronizing signals, horizontal and vertical blanking signals, pixel clock and line video timing signals.

66. The method as set forth in claim 65 further comprising the steps of:
providing two interlaced fields of map or overlay data,
generating first starting addresses for said first field and second starting addresses for said second field,
generating sequential addresses along every other parallel line beginning with said first starting addresses to generate said first field of data and to generate sequential addresses along the parallel lines between said very other parallel line beginning with said second starting addresses to generate said second field of data interlaced with said first field of data,
synchronously with said vertical synchronization signal generating a ping-pong memory select signal for alternately and sequentially selecting one of said first or second memory banks and one of said third or fourth memory banks, for reading one of said first or second memory banks and writing into one other than said one of said first or second memory banks, and reading one of said third or forth memory banks and writing into one other than said one of said third or fourth memory banks.

67. The method as set forth in claim 66, further comprising the step of generating a ping-pong select signal synchronous with a predetermined video frame rate, wherein said video frame rate is comprised of three fields comprised of sequentially addressing said first and second fields of data.

68. The method as set forth in claim 67, said cache memory means further comprising:
providing a plurality of address selector switch means responsive to address signals, control signals, and map or overlay data, for selectively addressing one of a plurality of said storage segments,
selectively providing map and overlay data to be stored in said plurality of storage segments of said cache memory means, and
selectively enabling said first, second, or third buffer means for loading data from a first data bus coupled to said mass data controller means into said storage segments and for loading stored data into a second data bus coupled to said video processor means,
so that ones of said storage segments can be loaded with map or overlay data while still further ones of said storage segments can be simultaneously read into said first or second scene memories, whereby said scene memories can be loaded without contemporaneous access of said mass memory unit.

69. The method as set forth in claim 68 further comprising the step of storing an address in a display list register wherein associated overlay data is stored in at least one of said parallel planes.

70. The method as set forth in claim 69, further comprising the step of generating an analog video signal in RS-170A format.

* * * * *